(12) United States Patent
Pak et al.

(10) Patent No.: US 11,044,070 B2
(45) Date of Patent: Jun. 22, 2021

(54) MULTI-PROTOCOL CONTACTLESS COMMUNICATION

(71) Applicant: Keyssa Systems, Inc., Campbell, CA (US)

(72) Inventors: Edward T. Pak, Saratoga, CA (US); Roger D. Isaac, San Jose, CA (US)

(73) Assignee: Keyssa Systems, Inc., Campbell, CA (US)

( * ) Notice: Subject to any disclaimer, the term of this patent is extended or adjusted under 35 U.S.C. 154(b) by 29 days.

(21) Appl. No.: 16/278,039

(22) Filed: Feb. 15, 2019

(65) Prior Publication Data

US 2019/0260567 A1    Aug. 22, 2019

Related U.S. Application Data

(63) Continuation of application No. 15/210,702, filed on Jul. 14, 2016, now Pat. No. 10,225,066.

(51) Int. Cl.
| | |
|---|---|
| *H04L 1/00* | (2006.01) |
| *H04L 1/18* | (2006.01) |
| *H04L 1/08* | (2006.01) |
| *H04L 5/16* | (2006.01) |
| *H04W 76/14* | (2018.01) |
| *H04B 3/00* | (2006.01) |
| *H04L 12/26* | (2006.01) |

(52) U.S. Cl.
CPC ............... *H04L 5/16* (2013.01); *H04B 3/00* (2013.01); *H04L 1/0041* (2013.01); *H04L 1/0061* (2013.01); *H04L 1/08* (2013.01); *H04L 1/1874* (2013.01); *H04W 76/14* (2018.02); *H04L 43/10* (2013.01)

(58) Field of Classification Search
None
See application file for complete search history.

(56) References Cited

U.S. PATENT DOCUMENTS

| | | |
|---|---|---|
| 7,296,085 B2 | 11/2007 | Engel |
| 7,545,883 B2 | 6/2009 | Feher |
| (Continued) | | |

FOREIGN PATENT DOCUMENTS

| | | |
|---|---|---|
| CN | 1606310 | 4/2005 |
| CN | 102404100 | 4/2012 |
| (Continued) | | |

OTHER PUBLICATIONS

CN Office Action in Chinese Appln. No. 201710574799.9, dated Apr. 28, 2020, 19 pages (with English translation).

(Continued)

*Primary Examiner* — Phung M Chung
(74) *Attorney, Agent, or Firm* — Fish & Richardson P.C.

(57) ABSTRACT

Methods, systems, and apparatus for EM communications. One of the methods includes determining, at a first device, that a second device is present; initiating a half duplex communication with the second device; configuring communication with the second device including determining whether full duplex communication is available; in response to a determination that full duplex communication is not available, communicating with the second device in half duplex mode; and in response to a determination that full duplex communication is available, communication with the second device in full duplex mode.

18 Claims, 14 Drawing Sheets

(56) References Cited

U.S. PATENT DOCUMENTS

| | | | |
|---|---|---|---|
| 8,615,018 B2 | 12/2013 | Diab | |
| 9,888,507 B2* | 2/2018 | Kyles | H04B 1/401 |
| 10,015,744 B2* | 7/2018 | Cherniavsky | H04W 76/12 |
| 10,225,066 B2 | 3/2019 | Pak et al. | |
| 10,349,465 B2* | 7/2019 | Kyles | H04B 1/401 |
| 2005/0097212 A1 | 5/2005 | Engel et al. | |
| 2009/0097393 A1 | 4/2009 | Diab et al. | |
| 2011/0228936 A1* | 9/2011 | Silvermint | H04Q 9/04 380/255 |
| 2013/0225077 A1* | 8/2013 | Schultz | H02J 50/10 455/41.1 |
| 2013/0322556 A1 | 12/2013 | Thomas et al. | |
| 2017/0031863 A1* | 2/2017 | Glaser | G06F 1/12 |
| 2017/0318618 A1* | 11/2017 | McCormack | H04W 76/14 |
| 2018/0019861 A1 | 1/2018 | Pak et al. | |

FOREIGN PATENT DOCUMENTS

| | | |
|---|---|---|
| CN | 103988442 | 8/2014 |
| CN | 104811971 | 7/2015 |
| DE | 11 2011 105 991 | 9/2014 |

OTHER PUBLICATIONS

German Search Report in German Application No. 102017115329.2, dated Feb. 16, 2018, 16 pages (with English Translation).
The TCP/IP Guide [online]. "TCP Segment Retransmission Timers and the Retransmission Queue," Sep. 20, 2005, [retrieved on Feb. 16, 2018], retrieved from URL<http://www.tcpipguide.com/free/t_TCPSegmentRetransmissionTimersandtheRetransmission.htm> 2 pages.

\* cited by examiner

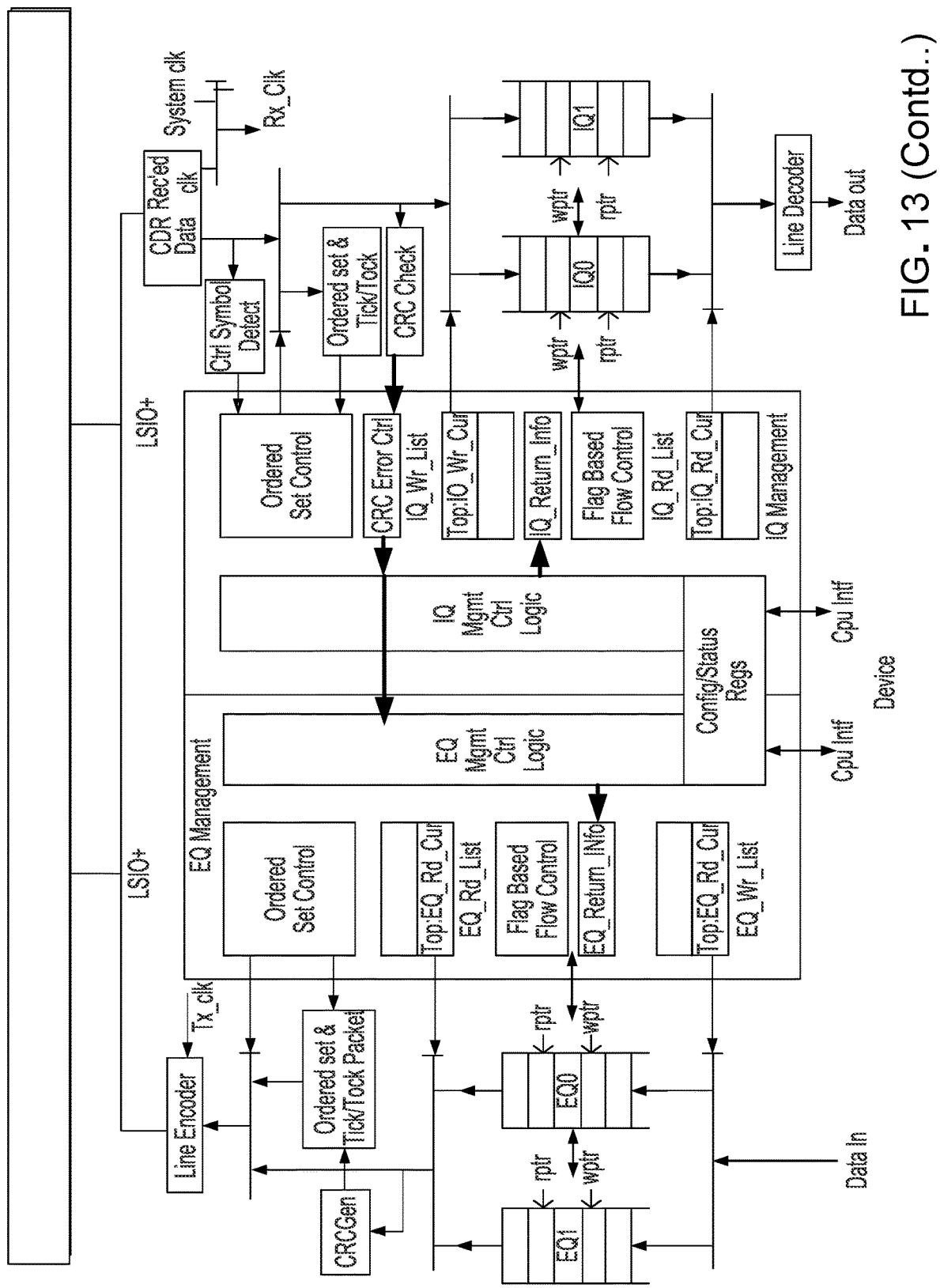
FIG. 13 (Contd..)

MULTI-PROTOCOL CONTACTLESS COMMUNICATION

CROSS-REFERENCE TO RELATED APPLICATIONS

This application is a continuation application of, and claims priority to, U.S. patent application Ser. No. 15/210,702, for "Multi-Protocol Contactless Communication," filed on Jul. 14, 2016. The disclosure of the foregoing application is incorporated here by reference.

BACKGROUND

This specification relates to electromagnetic communications.

Advances in semiconductor manufacturing and circuit design technologies have enabled the development and production of integrated circuits (ICs) with increasingly higher operational frequencies. In turn, electronic products and systems incorporating high frequency integrated circuits are able to provide greater functionality than previous generations of products. The additional functionality has typically included the processing of increasingly larger amounts of data at increasingly higher speeds.

Additionally, conventional electronic products and systems can communicate using a variety of high-speed protocols. Conventional connectors typically require that the particular connector and protocol be specified when a product is built. This limits the types of connections that are possible between two products. For example, if a product is designed for a universal serial bus 3.0 (USB 3.0) connection, this limits the communication of that product with others to USB 3.0 connections over a given connector. If more protocols are to be supported, additional connectors are typically added to the product.

SUMMARY

In general, one innovative aspect of the subject matter described in this specification can be embodied in methods that include the actions of determining, at a first device, that a second device is present; initiating a half duplex communication with the second device; configuring communication with the second device including determining whether full duplex communication is available; in response to a determination that full duplex communication is not available, communicating with the second device in half duplex mode; and in response to a determination that full duplex communication is available, communication with the second device in full duplex mode. Other embodiments of this aspect include corresponding computer systems, apparatus, and computer programs recorded on one or more computer storage devices, each configured to perform the actions of the methods. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

The foregoing and other embodiments can each optionally include one or more of the following features, alone or in combination. In particular, one embodiment includes all the following features in combination. Half duplex mode uses a single transceiver that transmits data to the second device and receives data from the second device. Initiating half duplex communication includes incorporating signals in outgoing transmissions indicating that the receiver of the second device is clear to switch to a transmission mode. The signals include the use of tick/tock packets. Configuring communication includes determining one or more communication protocols supported by the second device. Configuring communication includes configuring ingress and egress queues.

Transmitting data to the second device in half duplex mode includes: adding data to transmit to an egress queue; storing the data in the egress queue until the device is in transmit mode; once in transmit mode, transmitting the data in the egress queue to the second device; and holding the data in the egress queue until error free receipt is confirmed. The data in the egress queue is transmitted with a tick/tock packet indicating a switch of the second device from receiver mode to transmission mode. The data in egress queue is transmitted with CRC codes for error checking. In response to receiving a confirmation of error free receipt of the data, the data is cleared from the egress queue. In response to receiving a confirmation of an error, the data in the egress queue is resent until error free receipt is confirmed or a specified number of retries have been attempted.

Receiving data from the second device in half duplex mode includes: receiving a data transmission; adding the received data to an ingress queue; determining if there is an error in the received data; in response to determining that there is not an error, transferring the data from the ingress queue for decoding and processing; and in response to determining that there is an error, holding the data in the ingress queue until error free data has been resent.

Configuring communication includes determining power states. An active state, initialization state, and sleep mode are selectively signaled to the second device for power management. Operation in sleep state includes: periodically transmitting a series of pings; and for each transmitted series of pings, switching from transmission mode to receiver mode to receive a return ping from the second device. The method further includes: changing the frequency of the series of pings to signal a change in power state for the second device. Transitioning a host from initialization state to active state includes: detecting, by a host in half-awake state transmitter mode, a device using sideband signaling; transmitting a series of pulses to the device; transitioning to an initialization state receiver mode and listening for a response to the series of pulses; and in response to receiving the response, transitioning to an active state transmitter mode. Transitioning the device from initialization state to active state includes: detecting one or more of the series of pulses transmitted by the host; transitioning the device to an initialization state transmitter mode and transmitting a series of response pulses; and transitioning the device to an active state receiver mode.

In general, one innovative aspect of the subject matter described in this specification can be embodied in systems that include a device having a communication module including a plurality of integrated circuit packages, wherein the communication module is configured to selectively operate in a half duplex communication mode or a full duplex communication mode when a contactless connection is made with another device, wherein half duplex communication mode uses only one of the plurality of integrated circuit packages to send and receive data, and wherein full duplex communication mode uses two or more of the integrated circuit packages, each of the integrated circuit packages operating as one of a transmitter or a receiver. The foregoing and other embodiments can each optionally include a side band sensor configured to detect the presence of another device.

In general, one innovative aspect of the subject matter described in this specification can be embodied in methods that include the actions of determining, at a first device, that a second device is present; initiating communication with the second device using a high speed communication mode; configuring communication with the second device including determining whether high speed communication is available; in response to a determination that high communication is not available, communicating with the second device in low speed communication mode, wherein the low speed communication mode may be full duplex or half duplex; and in response to a determination that high speed communication is available, communication with the second device in full duplex mode.

The subject matter described in this specification can be implemented in particular embodiments so as to realize one or more of the following advantages. A single contactless connector is provided that allows for communication using a variety of different protocols including both single lane lower speed communication and dual lane higher speed communication. In particular, using a contactless connection instead of a physical electrical connection, different protocols can be used without concern for electrical incompatibility. The contactless connector is scalable and allows for connections for high-end devices such as displays and low-end devices such as wearables or internet of things (IoT) devices. The scalability also allows for low-power and standby options that reduce the number of active communication links to conserve power, for example, using a single communication link instead of dual communication links. The contactless connector can be used in host to device connections as well as peer to peer connections.

The details of one or more embodiments of the invention are set forth in the accompanying drawings and the description below. Other features, objects, and advantages of the invention will be apparent from the description and drawings, and from the claims.

BRIEF DESCRIPTION OF DRAWINGS

Like reference symbols in the various drawings indicate like elements.

DETAILED DESCRIPTION

Overview

Figure 1:
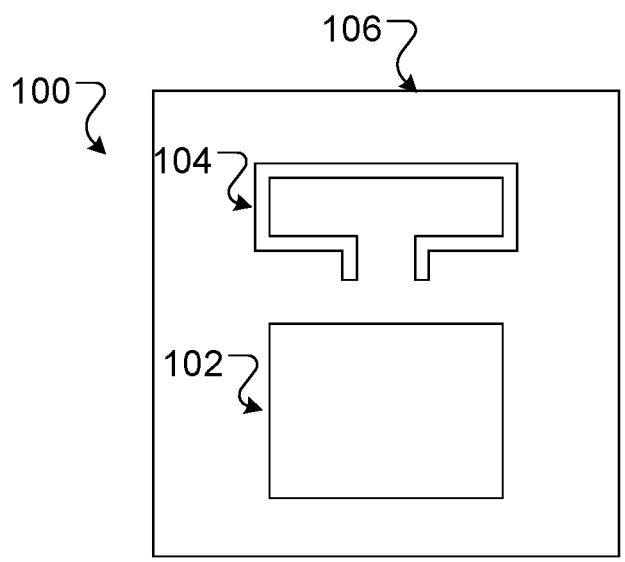
FIG. 1 is an overhead view of an example IC package.

This specification describes contactless connectors that allow for communication using a variety of different protocols and that are configured to provide data communication on one or more communication links.

For devices, e.g., mobile phones or tablets, to be versatile they should support an ability to communication with a variety of add-on devices. The contactless connector can be used to provide communication between different types of devices including devices in a host-device arrangement and devices in a peer to peer relationships. The different types of add-on devices can have different requirements, protocols, and capabilities. For example, some devices can operate at high speed with fast data rates while other devices can operate at lower speed with lower data rates.

The contactless connector can include a communication module having one or more integrated circuit packages. Each integrated circuit package can have a transmitter, receiver, or transceiver. Lower speed devices can include a communication module only having one integrated circuit package, e.g., having a transceiver, while higher speed devices can have a communication module having two or more integrated circuit packages. This specification describes contactless connector that can selectively provide high speed communication using two or more integrated circuit packages or low speed communication using a single integrated circuit package, or two or more integrated circuit packages.

Contactless Communication Modules

Contactless communication may be used to provide signal communications between components on a device or may provide communication between devices. In one example, tightly-coupled transmitter/receiver pairs may be deployed with a transmitter disposed at a terminal portion of a first conduction path and a receiver disposed at a terminal portion of a second conduction path. The transmitter and receiver may be disposed in close proximity to each other depending on the strength of the transmitted energy, and the first conduction path and the second conduction path may not be contiguous with respect to each other. In some examples, the transmitter and receiver may be disposed on separate circuit carriers positioned with transducers (e.g., one or more antennas) of the transmitter/receiver pair in close proximity.

A transmitter, receiver, or transceiver may be configured as an integrated circuit (IC) package, in which one or more transducers may be positioned adjacent to a die and held in place by a dielectric or insulating encapsulation or bond material. A transducer may also be held in place by a lead frame substrate. Note that IC packages are examples of contactless communication units that are also variously referred to as communication units, communication devices, comm-link chips, comm-link chip assemblies, comm-link chip packages, and/or comm-link packages, which may be configured in various ways. For example, IC packages, communication units, communication devices, comm-link chips, comm-link chip assemblies, comm-link chip packages, and/or comm-link packages may each include one or more ICs, chips, or dies and have circuit functionality appropriate for particular applications.

FIG. 1 shows an example IC package 100. The IC package 100 includes a die 102 and a transducer 104 providing conversion between electrical and EM signals. The IC package 100 may include additional structures, for example, conductive connectors, such as bond wires, electrically connecting the transducer to bond pads connected to a transmitter and/or receiver circuit included in die 102. The IC package 100 further includes an encapsulating material 106 formed around at least a portion of the die 102 and/or the transducer 104. In the example IC package 100, the encapsulating material 104 completely covers the die 100 and the transducer 104.

The die 102 includes any suitable structure configured as a circuit on a suitable die substrate. In some implementations, the die can alternatively be referred to as a chip or an integrated circuit. The die substrate may be composed of any suitable semiconductor material, for example, silicon. The die 102 may be mounted with electrical conductors, such as a lead frame, not shown in FIG. 1, electrically coupling the die 102 to one or more external circuits. The IC package 100 can further include a transformer to provide impedance matching between a circuit on the die 102 and the transducer 104.

The transducer 104 may be in the form of a folded dipole or loop antenna and is configured to transmit and/or receive electromagnetic signals. In some implementations, the transducer 104 is configured to operate at radio frequencies including radio frequencies in the extremely high frequency (EHF) band of the electromagnetic spectrum, e.g., frequencies from 30 to 300 gigahertz. As shown in IC package 100, the transducer 104 is separate from the die 102, but is coupled to the die 102 by suitable conductors, not shown. The dimensions of the transducer are determined such that they are suitable for operation in the specified frequency band of the electromagnetic spectrum, e.g., the EHF band.

The encapsulating material 106 can be used to assist in holding the various components of IC package 100 in fixed relative positions. The encapsulating material 106 may be formed from a suitable material configured to provide electrical insulation and physical protection for the components of IC package 100. Additionally, the encapsulating material 106 can be selected from a material that does not impede, or that optimizes passage of, signals to or from the transducer 104. For example, the encapsulating material 106 can be composed of glass, plastic, or ceramic. The encapsulating material 106 may also be formed in any suitable shape. For example, the encapsulating material 106 may be in the form of a rectangular block, encapsulating all components of the IC package 100 except for any unconnected ends of conductors connecting the die 102 to external circuits.

Figure 2:
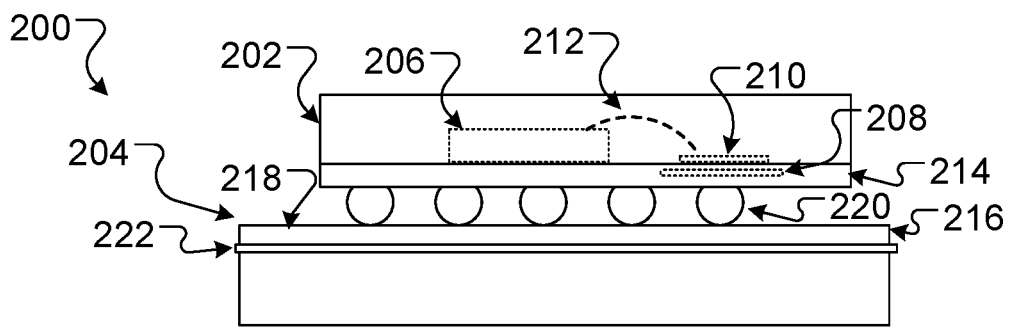
FIG. 2 shows a side view representation of an example communication device including an IC package.

FIG. 2 shows a side view representation of an example communication device 200 including an IC package 202 mounted to a PCB 204. The IC package 202 includes a die 206, a ground plane 208, a transducer 210, and one or more bond wires 212 connecting the die 206 to the transducer 210. The die 206 and transducer 210 are mounted on a package substrate 214 and encapsulated in an encapsulating material. The ground plane 208 is within the package substrate 214 and is a suitable structure configured to provide an electrical ground for the transducer 210. The ground plane 208 can extend the entire length of the package substrate 214 or just a portion, in particular, a portion underneath the transducer 210. The PCB 204 includes a top dielectric layer 216 having a surface 218. The IC package 202 is mounted to the surface 218 with mounting bumps 220 attached to a metallization pattern (not shown).

The PCB 204 also optionally includes a layer 222 spaced from dielectric layer 216 made of conductive material forming a ground plane within the PCB 204. The PCB ground plane may be any suitable structure configured to provide an electrical ground to circuits and components on the PCB 204.

Figure 3:
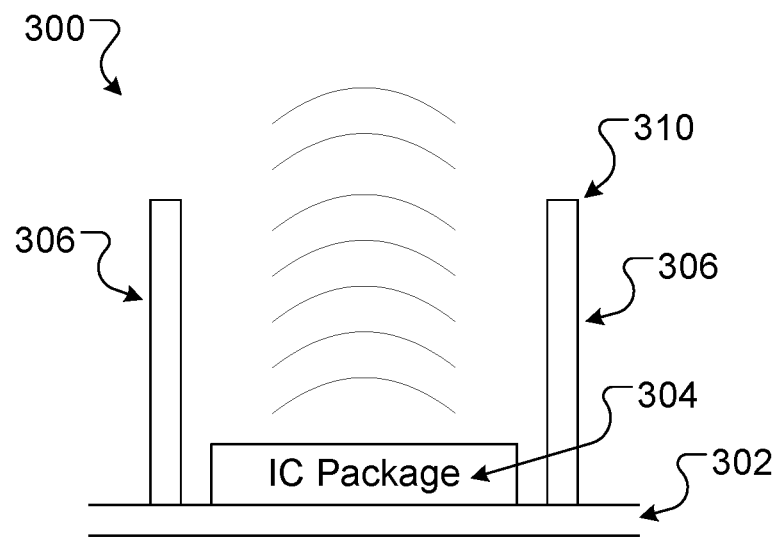
FIG. 3 is a side view of an example communication module including a signal guiding structure.

FIG. 3 is a side view of an example communication module 300 including a signal guiding structure. As shown in FIG. 3, the communication module 300 includes a PCB 302, an IC package 304, and a signal guiding structure 306 providing a signal pathway. The communication module 300, can include a transmitter or receiver for transmitting or receiving signals, e.g., radio frequency signals.

In particular, the IC package 304 can correspond to the IC packages described above with respect to FIGS. 1 and 2. The IC package 304 is mounted on the PCB 302. For example, the IC package 304 can be mounted to the PCB as described with respect to FIG. 2.

The communication module 300 can be configured to transmit or receive data using radio frequency communication. For example, if the communication module 300 includes a transmitter, the communication module 300 can transmit data, which can then be received by a receiver, e.g., of another communication module.

The signal guiding structure 306 is configured to aid in directing radio frequency (RF) signals as well as to reduce interference from spurious signals. The signal guiding structure 306 can surround a perimeter of the IC package and extend in the direction of signal transmission and/or reception by a specified amount to provide a channel for emitted or received RF signals. For example, the signal guiding structure 306 can have a height 310 suitable for a particular device including the communication module 300 and that allows the signal guiding structure 306 to be positioned in proximity to a corresponding signal guiding structure of another communication module when used to communicate with another device. The height of the signal guiding structure 306 relative to the PCB 302 can be configured such that when the communication module 300 is positioned the signal guiding structure 306 is proximal to an external device housing. The signal guiding structure can be composed of a suitable material that is configured to reduce extraneous signals without disrupting passage of communications along the channel formed by the signal guiding structure 306.

FIG. 3 illustrates one IC package 304 mounted to the PCB 302. However, in other implementations, more than one IC package can be mounted to the same PCB 302. For example, a linear array of two or more IC packages, each having a corresponding signal guiding structure, are mounted to a single PCB.

The communication module 300 can be part of a communication system of a device, e.g., a computer, mobile phone, tablet, kiosk, or other device/system. The communication system can be configured to provide contactless communication using one or more IC packages. For example, the communication system can include two IC packages, one configured as a transmitter and the other configured as a receiver. The communication system can be in communication with a storage device. Thus, for example, the communication system can transfer data between the data storage unit and an external device using contactless communication provided by the IC packages.

Figure 4:
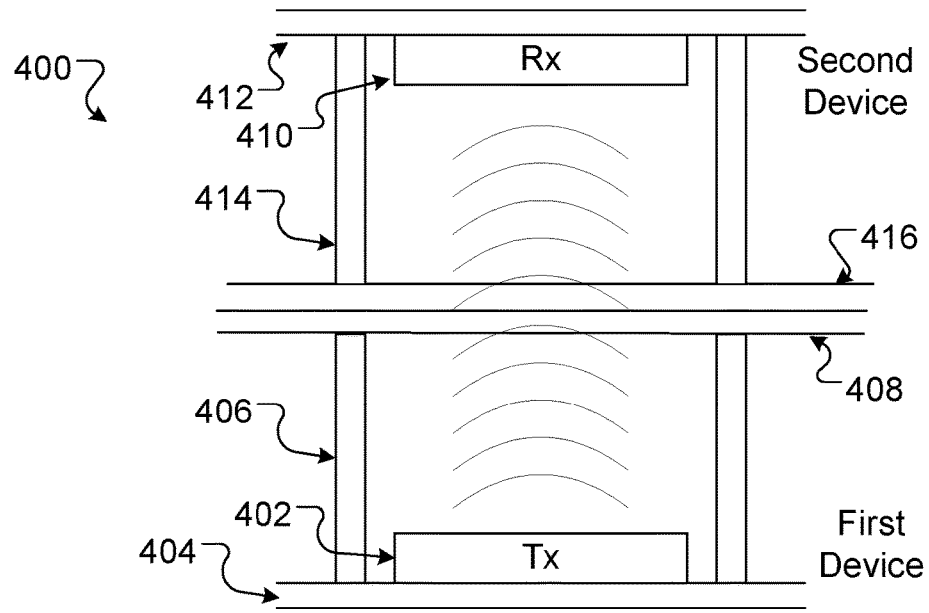
FIG. 4 is a side view diagram illustrating an example of single lane communication between devices.

FIG. 4 is a side view diagram 400 illustrating an example of single lane communication between a transceiver packages that can switch between transmitter and receiver. FIG. 4 illustrates communication between a transmitter and a receiver. For example, a user of a first device may wish to exchange data with a second device. Communication can flow in the opposite direction from the second device to the first device by switching the transmitter of the first device to a receiver and the receiver of the second device to a transmitter. The two devices can be positioned in proximity to each other such that the respective communication modules for transmitting and receiving data are aligned and in range of each other. In particular, for EHF frequencies, the transmitter and receiver of the two devices may need to be within specified distances. The distances can vary, for example, depending on the particular frequencies used, the materials between the transmitter and receiver, and the strength of the transmission.

In FIG. 4, a first device includes a first communication module having a transceiver IC package 402 operating as a transmitter and positioned on a first PCB 404. The transceiver IC package 402 is surrounded by a first signal guiding structure 406 forming a channel. The first signal guiding structure 406 extends to a surface of a first housing 408 of the first device. For example, the first device can be a first mobile phone and the first housing 408 can correspond to the outer case of the first mobile phone.

A second device includes a second communication module having a transceiver IC package 410 operating as a receiver and positioned on a second PCB 412. The transceiver IC package 410 is surrounded by a second signal guiding structure 414 forming a channel. The second signal guiding structure 414 extends to a surface of a second housing 416 of the second device. For example, the second device can be a second mobile phone and the second housing 416 can correspond to the outer case of the second mobile phone. The signal guiding structures can be formed of metallic or metallic lined walls that surround the IC package 410.

As illustrated by diagram 400, the first signal guiding structure 406 and the second signal guiding structure 414 are aligned and an outer surface of the first housing 408 and the second housing 416 are in physical contact to provide optimal communication distance and interference.

A data transmission from the transceiver IC package 402 passes through the channel formed by the first signal guiding structure 406 and the second signal guiding structure 414 to the transceiver IC package 410. For example, a pair of devices can communicate data between each other by transmitting data from the transceiver IC package 402 to the transceiver IC package 410. The signal guiding structures along with proper alignment can maximize the power of the transmission that is received by the receiver IC package. In some implementations, the signal guiding structures can be formed from, or include a layer of, a metallic material that reflects the transmitted data along the signal guiding structures toward the receiver. In some other implementations, the signal guiding structures can be formed from, or include a layer of, an electromagnetic absorbing material to reduce stray signals that may cause interference.

Figure 5:
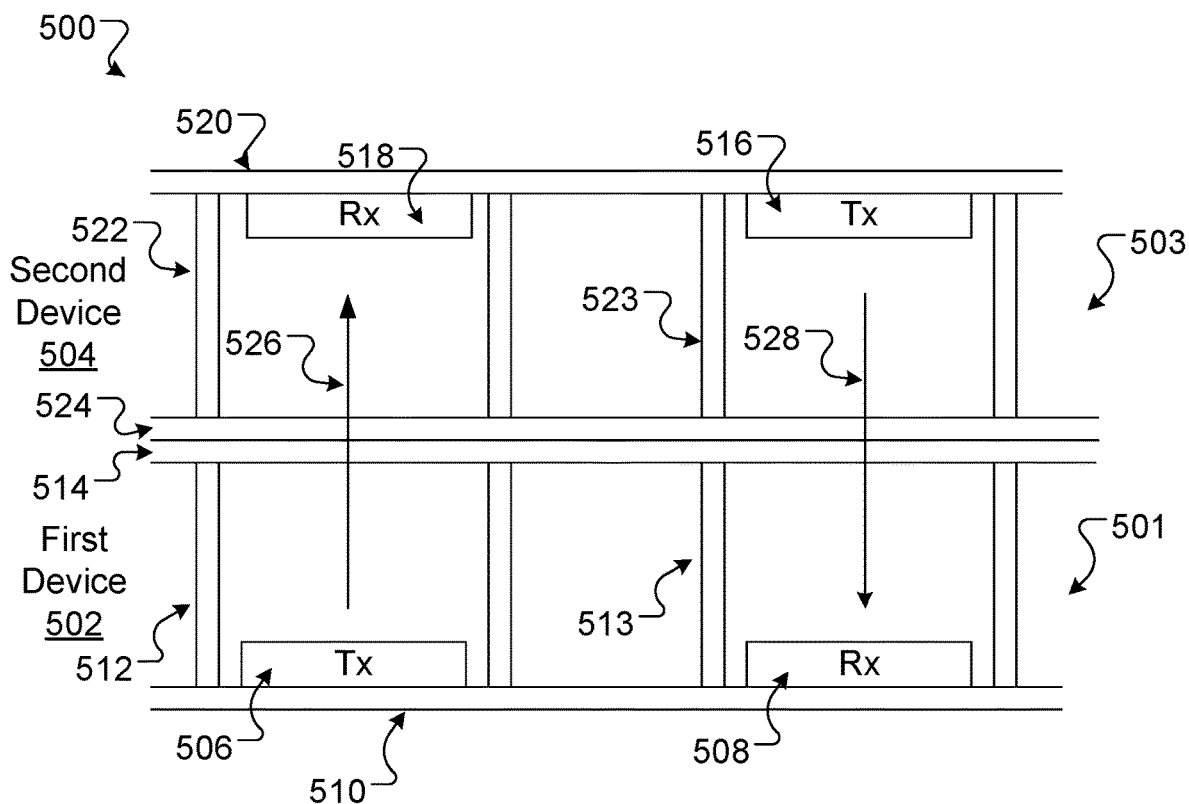
FIG. 5 is a side view diagram illustrating an example of dual lane communication between devices.

FIG. 5 is a side view diagram 500 illustrating an example of dual lane communication between devices. Diagram 500 includes a portion of a first device 502 and a second device 504.

The first device 502 includes a first communication module 501. The first communication module 501 includes a first transmitter IC package 506 and a first receiver IC package 508 mounted to a first PCB 510. The first transmitter IC package 506 may be a dedicated transmitter or may be a transceiver that can selectively function as a transmitter or a receiver. Similarly, the first receiver IC package 508 may be a dedicated receiver or may be a transceiver that can selectively function as a transmitter or a receiver. For example, as described in greater detail below, the first transmitter IC package may be a transceiver configured to provide half duplex communication when establishing a connection with another device and then switching to a dedicated transmitter role after establishing dual lane communication capability.

Each of the first transmitter IC package 506 and the first receiver IC package 508 is encircled by a respective first signal guiding structure 512, 513. The first signal guiding structures 512, 513 each form a channel extending from the respective IC package to a surface of a first housing 514 of the first device 502. For example, the first device 502 can be a first mobile phone and the first housing 514 can correspond to the outer case of the first mobile phone.

The second device 504 includes a second communication module 503. The second communication module 503 includes a second transmitter IC package 516 and a second receiver IC package 518 mounted to a second PCB 520. The second transmitter IC package 516 may be a dedicated transmitter or may be a transceiver that can selectively function as a transmitter or a receiver. Similarly, the second receiver IC package 518 may be a dedicated receiver or may be a transceiver that can selectively function as a transmitter or a receiver.

Each of the second transmitter IC package 516 and the second receiver IC package 518 is encircled by a respective second signal guiding structure 522, 523. As shown in FIG. 5, the first signal guiding structures 512, 513 and the second signal guiding structures 522, 523 are substantially aligned on either side of the respective first and second housings 514, 524. The alignment assists in decreasing loss from a data transmission 526 from the first transmitter IC package 506 to the second receiver IC package 518 and a data transmission 528 from the second transmitter IC package 516 to the first receiver IC package 508.

Single and Dual Lane Attachment

Figure 6:
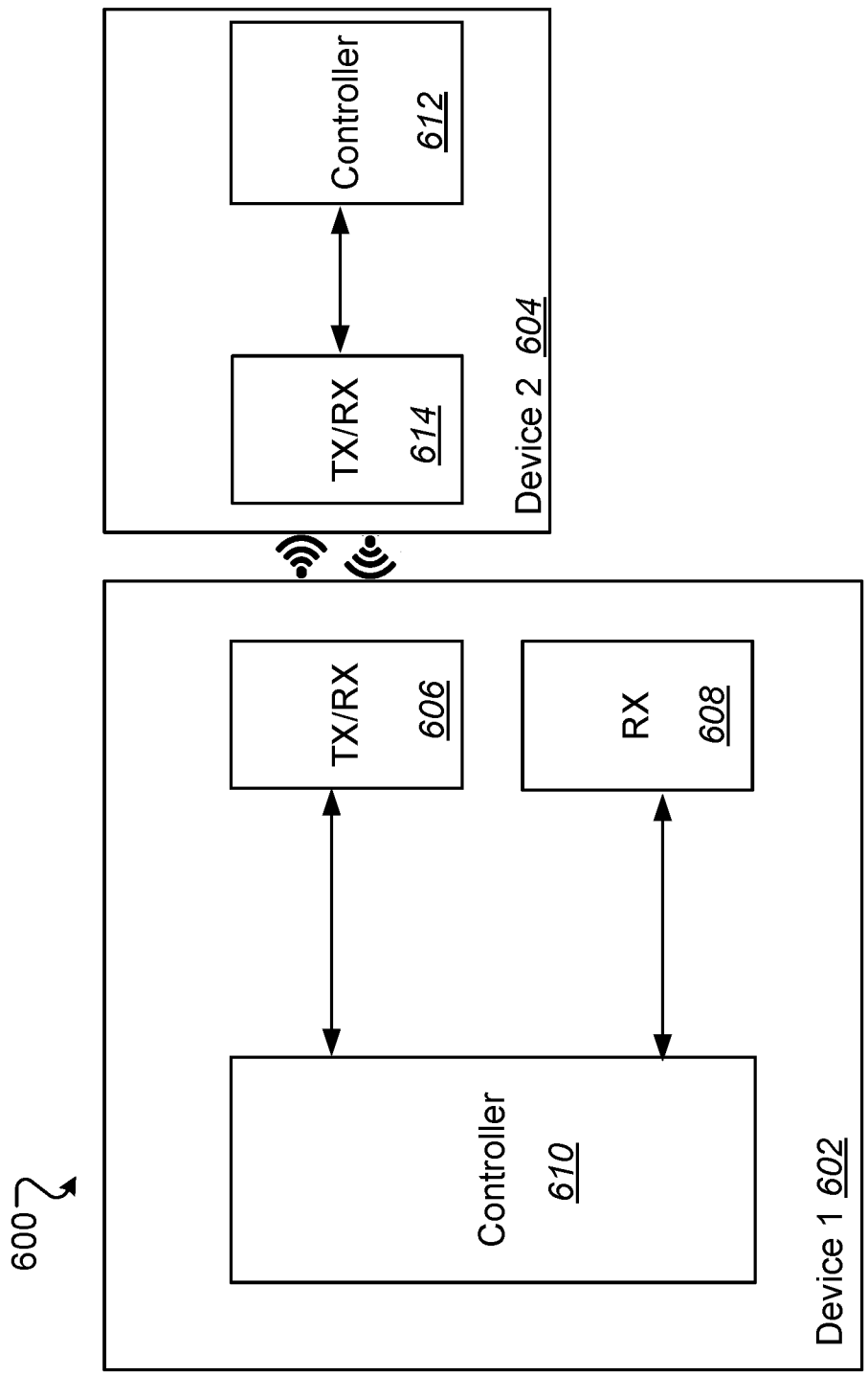
FIG. 6 is a block diagram of an example of single lane attachment between two devices.

FIG. 6 is a block diagram 600 of an example single lane attachment between devices. In particular, diagram 600 shows a single lane attachment between a first device 602 and a second device 604. In some implementations, the first device 602 is a host device and the second device 604 is an add-on device or peripheral device. The first device 602 includes a transceiver 606 and a receiver 608. In particular, the transceiver 606 is configured to operate as a transmitter in full duplex (dual or multi lane) mode and as a transmitter and receiver in half duplex (single lane) mode. The receiver 608 is configured to operate as a receiver in full duplex mode and to be inactive in half duplex mode. In some alternative implementations, the receiver 608 can be a second transceiver. This can provide additional flexibility in connecting devices. The transceiver 606 and the receiver 608 are each communicatively coupled to a controller 610 that manages transmission or receipt of data by the first device 602.

The second device 604 includes a transceiver 614 and a controller 612. The transceiver 614 is configured to operate as a transmitter and receiver in half duplex mode. The transceiver 614 is communicatively coupled to the controller 612 that manages transmission or receipt of data by the first device 604.

As shown in FIG. 6, the second device 604 is a low speed device having only a single transceiver 614 for contactless communication. Therefore, to communicate data between the first device 602 and the second device 604, single lane attachment is used that communicatively couples the transceiver 606 of the first device 602 to the transceiver 614 of the second device 604. As described in greater detail below, a handshake process may be used to determine the communication capabilities of the first and second devices. When a single lane device, e.g., the second device 604, is discovered by the first device 602, the transceiver 606 is configured to operate in half duplex mode such that it can both transmit to and receive data from the transceiver 614.

Figure 7:
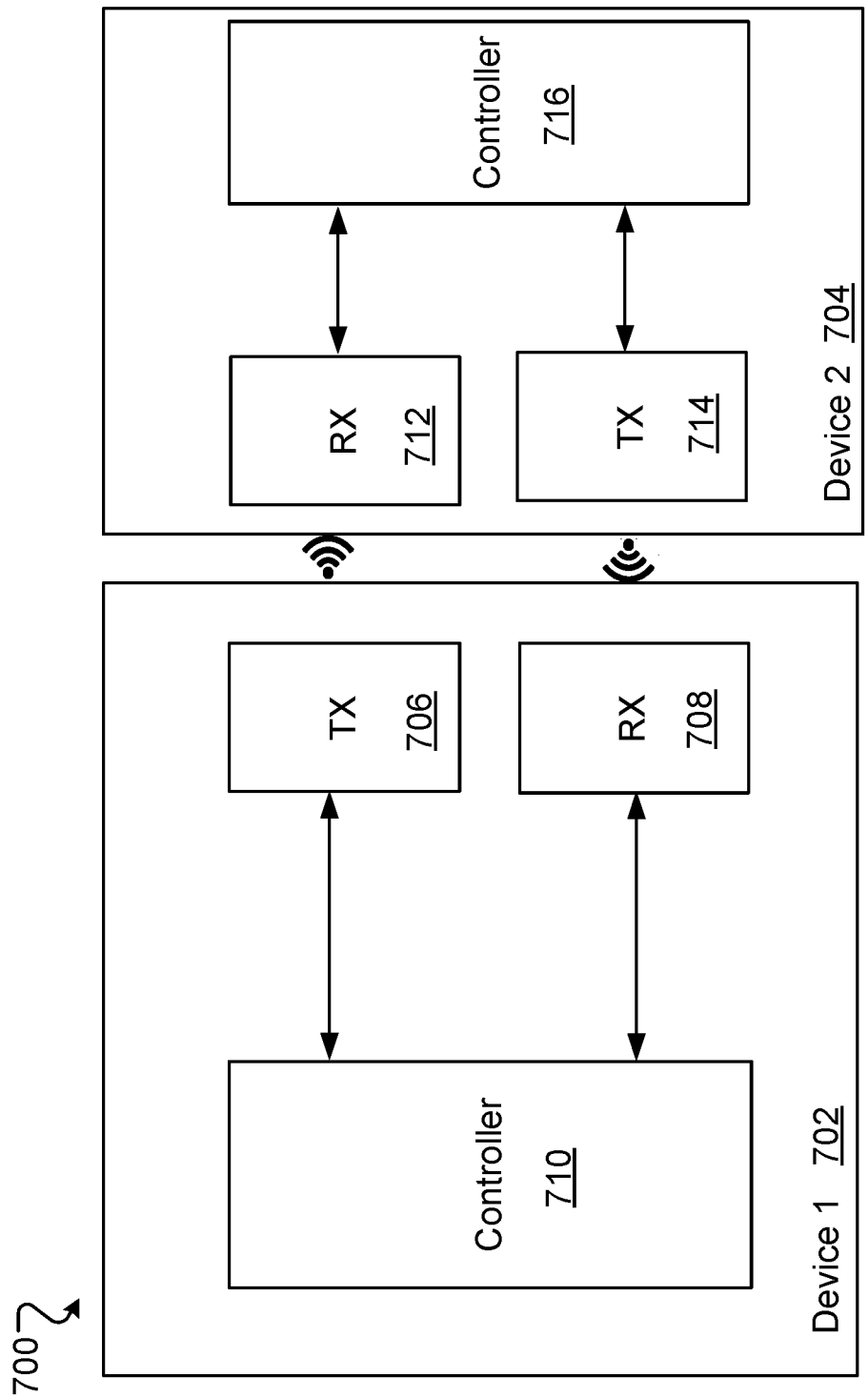
FIG. 7 is a block diagram of an example of dual lane attachment between two devices.

FIG. 7 is a block diagram 700 of an example dual lane attachment between devices. In particular, diagram 700 shows a dual lane attachment between a first device 702 and a second device 704. In some implementations, the first device 702 is a host device and the second device 704 is an add-on device or peripheral device. In some other implementations, the first device 702 and the second device 704 are peer devices.

The first device 702 includes a transmitter 706 and a receiver 708. In particular, the transmitter 706 can be a transceiver configured to operate as a transmitter in full duplex mode and as a transmitter and receiver in half duplex mode. The receiver 708 is configured to operate as a receiver in full duplex mode and to be inactive in half duplex mode. In some alternative implementations, the receiver 708 can be a second transceiver. This can provide additional flexibility in connecting devices. The transmitter 706 and the receiver 708 are each communicatively coupled to a controller 710 that manages transmission or receipt of data by the first device 702.

The second device 704 includes a transmitter 714 and a receiver 712. The receiver 712 can be a transceiver configured to operate as a receiver in full duplex mode and as a transmitter and receiver in half duplex mode. The transmitter 714 is configured to operate as a receiver in full duplex mode and to be inactive in half duplex mode. In some alternative implementations, the transmitter 714 can be a second transceiver. This can similarly provide additional flexibility in connecting devices. The transmitter 714 and the receiver 712 are each communicatively coupled to a controller 716 that manages transmission or receipt of data by the second device 704.

As shown in FIG. 7, the second device 704 is a high speed device having both a transmitter and a receiver for contactless communication. Therefore, to communicate data between the first device 702 and the second device 704, dual lane attachment is used that communicatively couples the transmitter 706 of the first device 702 to the receiver 712 of the second device 704 and communicatively couples the transmitter 714 of the second device 704 to the receiver 708 of the first device 702. As with the single lane attachment, a handshake process is used to determine the communication capabilities of the first and second devices. In particular, the communication may initiate in half duplex mode with communication between a transceiver of the first device 702 and a transceiver of the second device 704. When two or more lanes are discovered, the devices can move to full duplex mode using two or more communication lanes as described in greater detail below.

Alternatively, the second device 704 may be either a low speed or a high speed device having both a transmitter and a receiver for contactless communication. To communicate data between the first device 702 and the second device 704, dual lane attachment is used that communicatively couples the transmitter 706 of the first device 702 to the receiver 712 of the second device 704 and communicatively couples the transmitter 714 of the second device 704 to the receiver 708 of the first device 702. As with the single lane attachment, a handshake process is used to determine the communication capabilities of the first and second devices. The two devices may attempt communication first in a full duplex low speed mode, and upon the result of the handshaking process may continue to operate in the low speed mode or switch to a high speed full duplex mode. The result of the communication attempt may depend on whether the second device 704 supports a high speed mode. In some embodiments, the second device 704 may support a full-duplex high speed mode as well as a full-duplex low speed mode. In this case, the decision to operate in a high speed mode or a low speed mode may be application dependent.

The first device in FIG. 6 and FIG. 7 may be the same device coupled to respective second devices having different communication capabilities. Thus, the first device is configured to establish single or dual lane communication depending on the characteristics of the second device. Additionally, although the example shown FIG. 7 illustrates dual-lane devices, one or more devices can include more than two lanes for multi-lane communication e.g., incorporating additional transmitters or receivers configured to provide high speed communication between devices.

Establishing Communication

Figure 8:
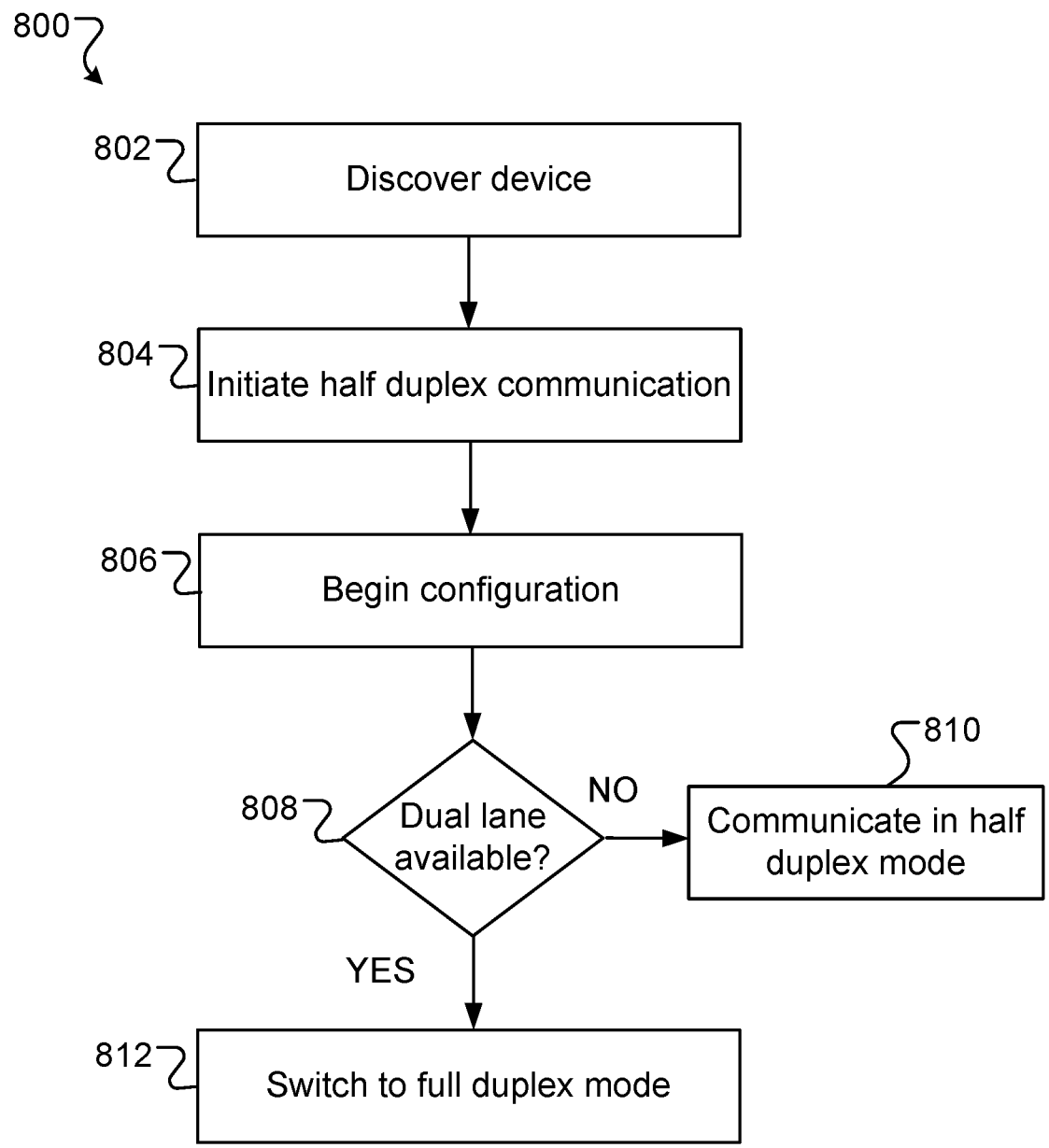
FIG. 8 is a flow diagram of an example process of initiating communication between devices.

FIG. 8 is a flow diagram of an example process 800 of initiating communication between devices. The process 800 can be performed by a device, for example, the first device 602 shown in FIG. 6 that is capable of both half duplex and full duplex communication. In particular, the process 800 can be performed by a host device or a peer device configured to act as a host device for the purpose of establishing communication.

The device performs a device discovery to detect the presence of a second device (802). In some implementations, a sideband signal is used to indicate device attachment. In some other implementations, the device includes a Hall effect sensor. A Hall effect sensor is a transducer that varies its output voltage in response to a magnetic field. Positioning the second device near the device can trigger this change in voltage indicating that the second device is present. In some other implementations, the device can periodically transmit a beacon ping, which can be received and responded to by the second device to determine the presence of the second device.

Once the second device is detected, the device initiates half duplex (single lane) communication with the second device (804). Half duplex communication requires the respective transceivers of each device to switch between transmitting and receiving modes. Particular signals can be used to indicate a mode switch. In some implementations, Tick/Tock packets can be used to signal switching between transmitter and receiver modes. For example, the first device can send a tick packet to the second device to indicate that the second device can now become the transmitter. The first device can switch the transmitter to a receiver after transmitting the tick packet. The second device can send a tock packet to the first device to indicate that the first device can again transmit. Tick/tock packet information can be set as specific packets during the respective transmit mode, for example, as cyclic redundancy check (CRC) data.

Additionally, in half duplex communication, after transmitting a tick packet and switching to receiver mode, the first device expects an acknowledgement or negative acknowledgement (e.g., an ACK or NAK packet) as the first packet received. Similarly, the second device expects a similar ACK/NAK packet as the first packet received after transmitting a tock packet.

For example, when the second device receives data including the tick packet indicating it can switch to transmitter mode, the second device transmits an acknowledgement packet (ACK) if the data was received correctly, e.g., no CRC error in the payload, or a negative acknowledgement (NAK), packet if the data was not correctly received, e.g., the payload has a CRC error. If a NAK packet is received, the device receiving the NAK can retry transmission of the data a specified number of times. Thus, if the second device sends a NAK packet, it can include a tock packet indicating the switch of modes for retry. The combination to tick/tock packets and associated ACK/NAK packets help provide a data integrity check on back and forth communications using the single lane provided by the respective transceivers.

Communication is initiated in lower speed half duplex mode. Once half duplex communication is initiated, configuration for communication is set (806). The configuration can include one or more of determining the protocols supported by the particular devices for communication, determining the number of lanes and speed per lane for single or multi-lane data communication, performing authentication, determining current power modes, allocating bandwidth, establishing queue sizes, as well as determining a particular line coding mode. In some implementations, half duplex mode can be a default configuration setting. The protocols supported can include, for example, general purpose input/output (GPIO) for low speed communications in half duplex mode. High speed communication in full duplex mode can support, for example, USB 3.0 DisplayPort (with AUX channel), PCIe, MIPI D-PHY, MIPI M-PH protocols. Supported protocols can be updated over time including support for custom protocols. Additionally, some full duplex modes are relatively lower in speed based on the particular protocols supported by the devices for communication. Queues used for communications management are described in greater detail below with respect to FIGS. 9-13. Different types of line coding can be used for half duplex communications including Manchester, 8B10B, data scrambling, or delimiters with Start/Stop bits.

Authentication may not be required, may provide light protection, or may be configured for strong protection. For example, light protection can be provided by a CRC check or a scrambler with a rotation of keys. Strong protection can be provided by key exchanges with validation. In some implementations, an initial pairing of devices may require stronger initial authentication that is lessened for subsequent pairings between the two devices. The communication link may be encrypted and protected using a key exchange protocol or secret keys. The two devices may be authenticated using single factor or multi-factor authentication.

Setting configuration includes determining whether dual lane or multi-lane (full duplex) communication is available (808). This can be determined as part of the half duplex communications establishing the configuration. Configuration can be based on information obtained from the device called "capability," which is predetermined by device manufacturers and defines the capabilities of the device.

In response to determining that dual lane communication is not available (no branch), the half duplex communication configuration is established and used for communication between the devices (810). In response to determining that dual lane or multi-lane communication is available (yes branch), the full duplex communication configuration is established and used for communication between the devices (812). The full duplex communications can be considered low speed or high speed based on the configuration, which depends on the capabilities and supported protocols of the devices. Consequently, communications can occur using one or more dedicated transmitter and receiver pairs rather than switching a transceiver between transmitter and receiver modes. Additionally, tick/tock packets may not necessary in full duplex communication since there may be no need to switch a transceiver between modes for back and forth communication.

In some alternative implementations, after a device is detected a high speed communication mode is initiated with the second device rather than using the low speed communication mode as a starting point. A determination is then made as to whether or not the high speed communication mode was initiated or available. If high speed mode is available or initiated, the communication with the second device is configured and carried out using the high speed communication mode. For example, full duplex communication can be configured for communication between the first device and the second device.

If the high speed mode is not available, the communication with the second device is initiated and configured for the low speed communication mode. Low speed communication mode may be either full duplex or half duplex communication depending on whether full duplex communication is available using lower speed protocols. The configuration for each communication mode can be carried out in a similar manner as described above. Using high speed communication mode as a starting point for establishing communication can increase the speed of configuring communication between two high speed compatible devices.

Half Duplex Communication Management

In the single lane half duplex mode of communication between devices, bandwidth management is important since a single path is used for communication in both directions. In some implementations, bandwidth management is managed by a host device or peer device designated to act as the host device.

The half duplex communication by a full duplex device can be managed, e.g., by a controller, in a manner that is invisible to the device processor. Thus, the half duplex communication can be seen by the device as behaving as full duplex. The half duplex communication may also be coordinated between the host and device processors.

Figure 9:
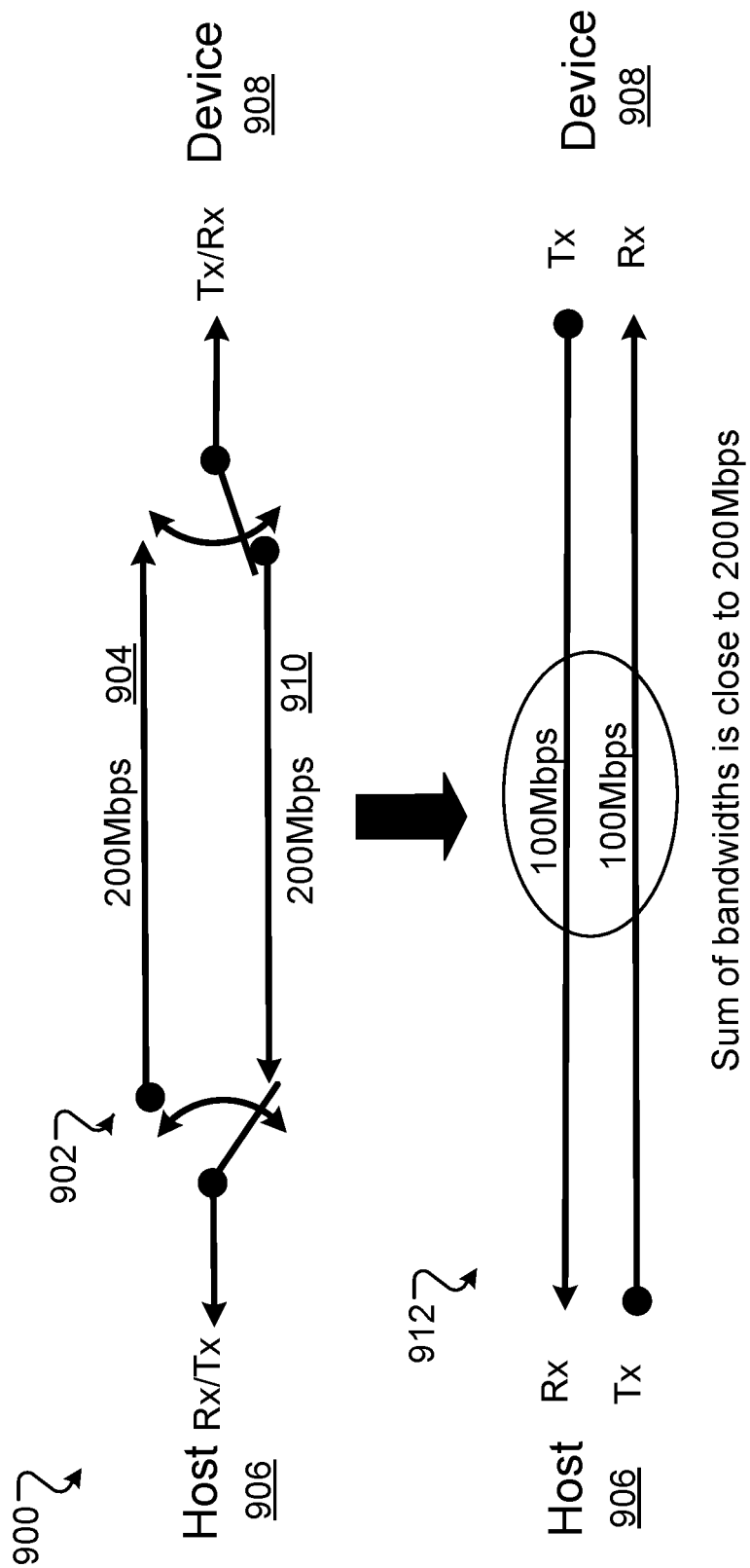
FIG. 9 is a diagram illustrating half duplex flow between devices.

FIG. 9 is a diagram 900 illustrating half duplex flow between two devices. A top portion 902 illustrates the bandwidth as controlled, e.g., by a controller, including switching transceivers between transmitter and receiver modes, for example, using tick/tock packets to signal switching. In top portion 902, each switched direction has a bandwidth of 200 megabits per second (Mbps). Specifically, 200 Mbps in the transmit direction 904 from a host device 906 to another device 908 and 200 Mbps in the receive direction 910 to the host device 906 from the other device 908.

A bottom portion 912 illustrates how this same communication is viewed from the perspective of the host device 906, as appearing to operate in full duplex mode. In particular, the host device 906 perceives a dual lane communication where a transmitter from the host device 906 has a bandwidth of 100 Mbps and a receiver of the host device receives data at a bandwidth of 100 Mbps. The sum of the two bandwidths is substantially close to the total 200 Mbps uses for each individual direction as switched. Thus, to the host device it appears to be a full duplex communication running at a lower speed in each direction.

Additionally, the controller can adjust the bandwidths allocated to IN packets, i.e., packets coming into the host from another device and OUT packets, i.e., packets going to the other device from the host. For example, for WRITE operations, the host device can increase OUT bandwidth allocation. For READ operations, the host can increase the IN bandwidth allocation.

Changing direction in the half duplex communication as transmitter and receiver modes are switched can introduce delays and gaps in communication. Queues can be used to hide these gaps and delays and can be configured based at least in part on the capabilities, including communication protocols, of the devices being connected.

Figure 10:
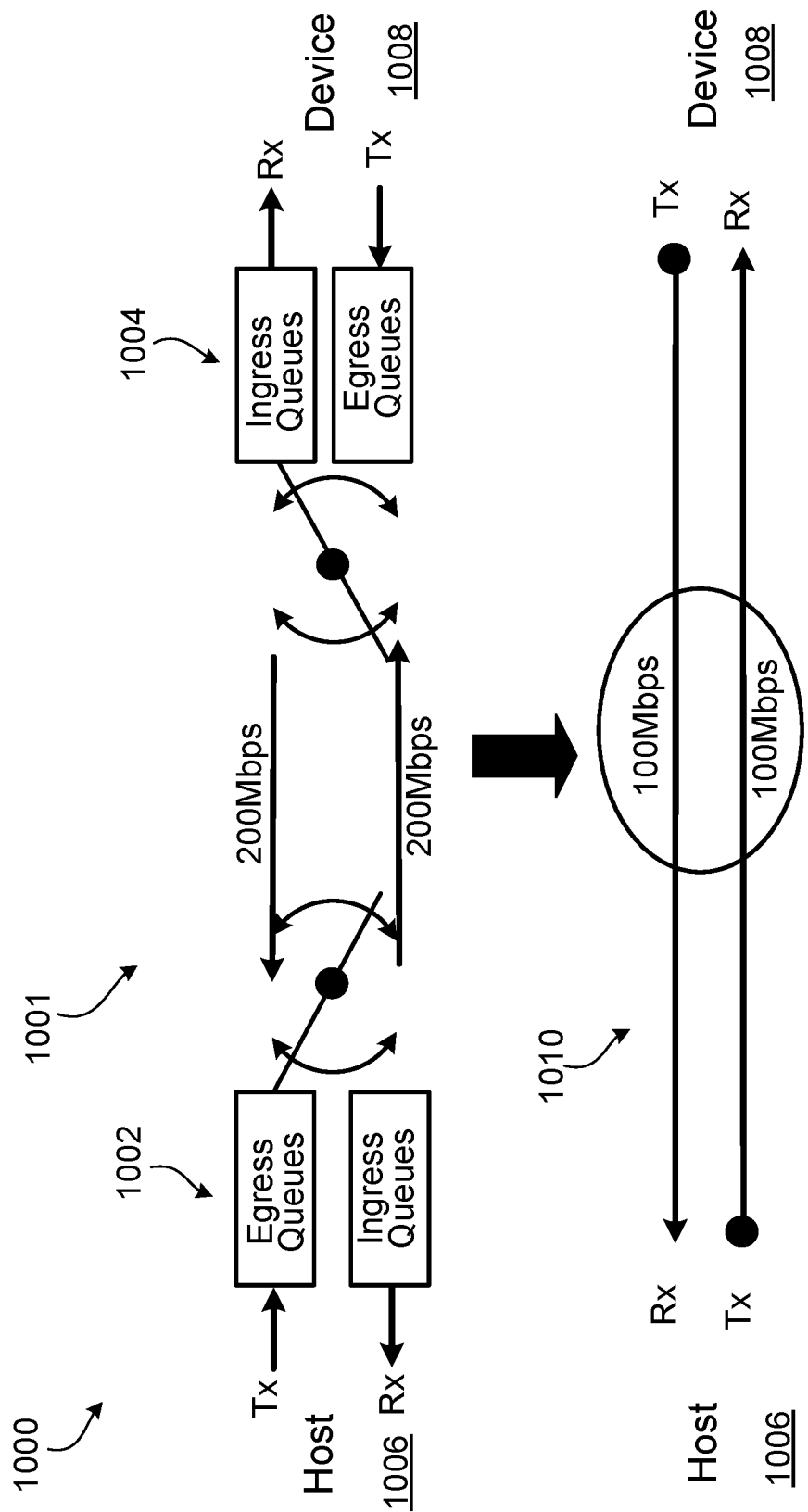
FIG. 10 is a diagram illustrating half duplex flow with ingress and egress queues.

FIG. 10 is a diagram 1000 illustrating half duplex flow with queues. In particular, the diagram 1000 is similar to the diagram 900 with the addition of queues. Specifically, a top portion 1001 illustrates the bandwidth as controlled, e.g., by a controller, including switching transceivers between transmitter and receiver modes. In the top portion, the host device 1006 includes host egress and ingress queues 1002 and the device 1008 includes device egress and ingress queues 1004. These queues help manage communications between the host and the device as the respective transceivers switch between transmitter and receiver modes. In some implementations, the number of queues established is based on a number of packets that the device can send at a time.

As in FIG. 9, a bottom portion 1010 illustrates how this same communication is viewed from the perspective of the host device 1006, as appearing to operate in full duplex mode. In particular, the host device 1006 perceives a dual lane communication where a transmitter from the host device 1006 has a bandwidth of 100 Mbps and a receiver of the host device receives data at a bandwidth of 100 Mbps. The upstream and downstream bandwidth allocations need not be equal. In particular, the bandwidth allocation between upstream and downstream can be managed by a host processor. For example, the downstream bandwidth may be allocated to have a majority of the overall bandwidth. In this case the downstream bandwidth may be set at 150 Mbps, while the upstream is allocated 50 Mbps. The total bandwidth available in any direction may be 200 Mbps at any given time, but the effective upstream and downstream bandwidth will be less than this number.

Figure 11:
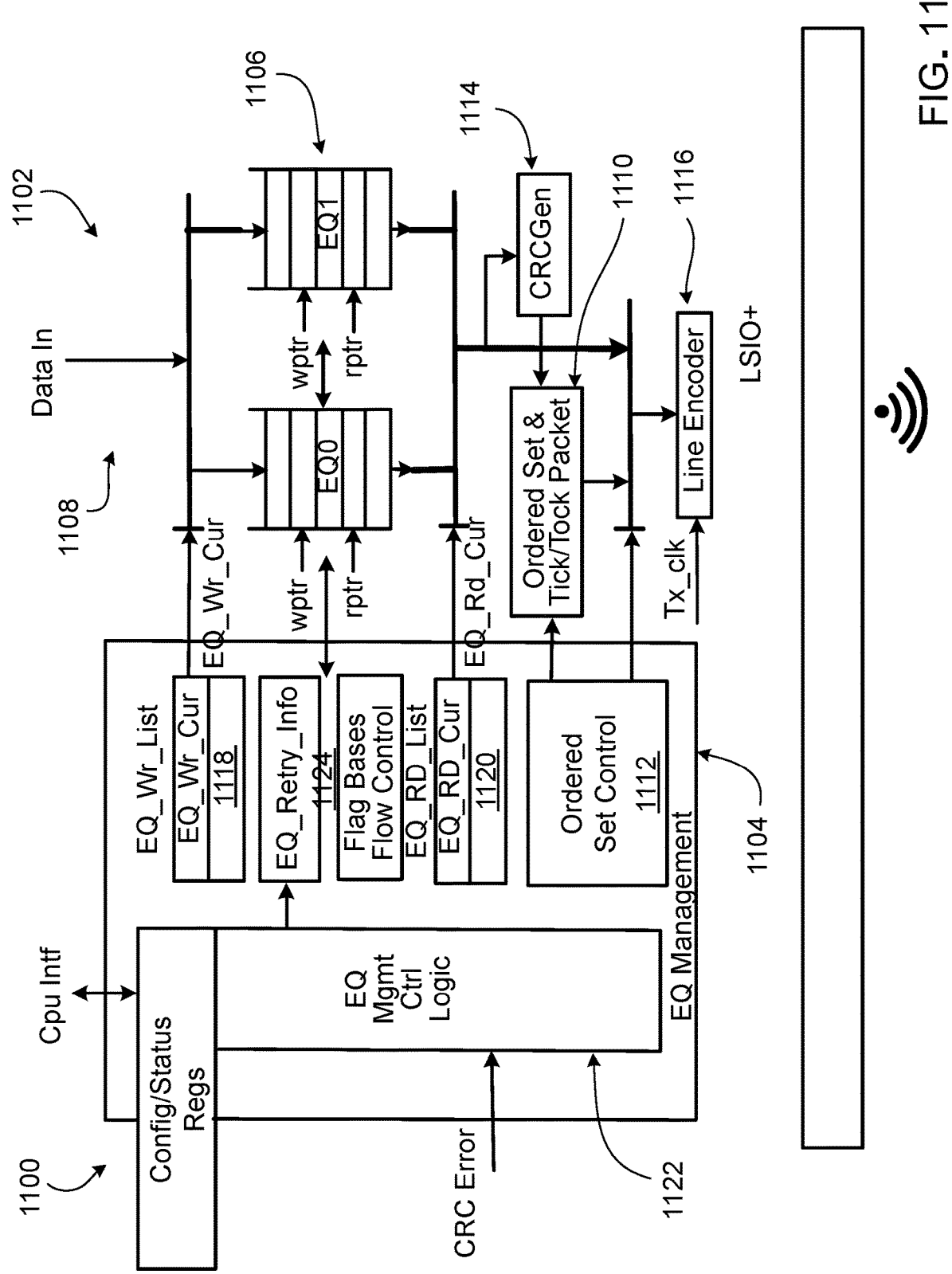
FIG. 11 is a block diagram illustrating communication using egress queues.

FIG. 11 is a block diagram 1100 illustrating communication using egress queues. Diagram 1100 illustrates data flow 1102 through egress queues as well as an egress queue management module 1104, for example, for a particular device such as a host device. The egress queues 1106 are configured, for example, to store output payloads until the direction changes to a transmit mode, e.g., based on respective tick/tock packets signals a switch between transmit and receive modes. In additional, data can be held in the egress queues until receipt is confirmed, e.g., by receiving an ACK message from another device following data transmission.

Each egress queue includes three stages. A new buffer indicating data can be written to the queue, a ready buffer indicating data can be transmitted, and a retry buffer that holds the data for possible retransmission. Data to be transmitted, data in 1108, is written to one or more of the egress queues, particularly the new buffer. If a new buffer of one egress queue is full, the data can be written to a new buffer of another egress queue.

A new buffer becomes a ready buffer when the new buffer is full and a ready buffer is available or when a timeout occurs for the new buffer, e.g., waited long enough to send data out. In some implementations, the new buffer and ready buffer are implemented as a ring buffer.

Data from the ready buffer can be transmitted when the device is in transmit mode. The data can be transmitted along with other information including respective tick/tock packet 1110 as controlled by ordered set control 1112 indicating that the recipient can switch to a transmitter mode as well as generated CRC codes 1114 for data integrity checking. The data is encoded based on the particular line encoding 1116 and then transmitted to a destination receiver.

Two egress queues 1106 are illustrated in diagram 1100, however additional egress queues can be included. The egress queues can be managed through list based management. An egress write list 1118 is generated where the most recent data to be queued for transmit is placed at the top of the list as the "egress write current." An egress read list 1120 is also generated with the most recent available read data as the "egress read current." When a write is completed, the egress write current is appended to the egress read list such that the queue just written is available for read. When a read is completed, the egress read current is appended to the egress write list such that the queue just read is again available for write.

When an error, e.g., a CRC error, is received for a particular transmitted queue data is received by the egress queue management module 1104, egress queue management control logic 1122 initiates retry attempts through egress retry and flag based flow control modules 1124. The queue data with the error remains in the egress queue read list 1120. The queue data is retransmitted until either a maximum number of retries are reached or a clean CRC is returned. The egress read current, being the one with the CRC error, is not appended to the egress write list until an error free receipt occurs.

Figure 12:
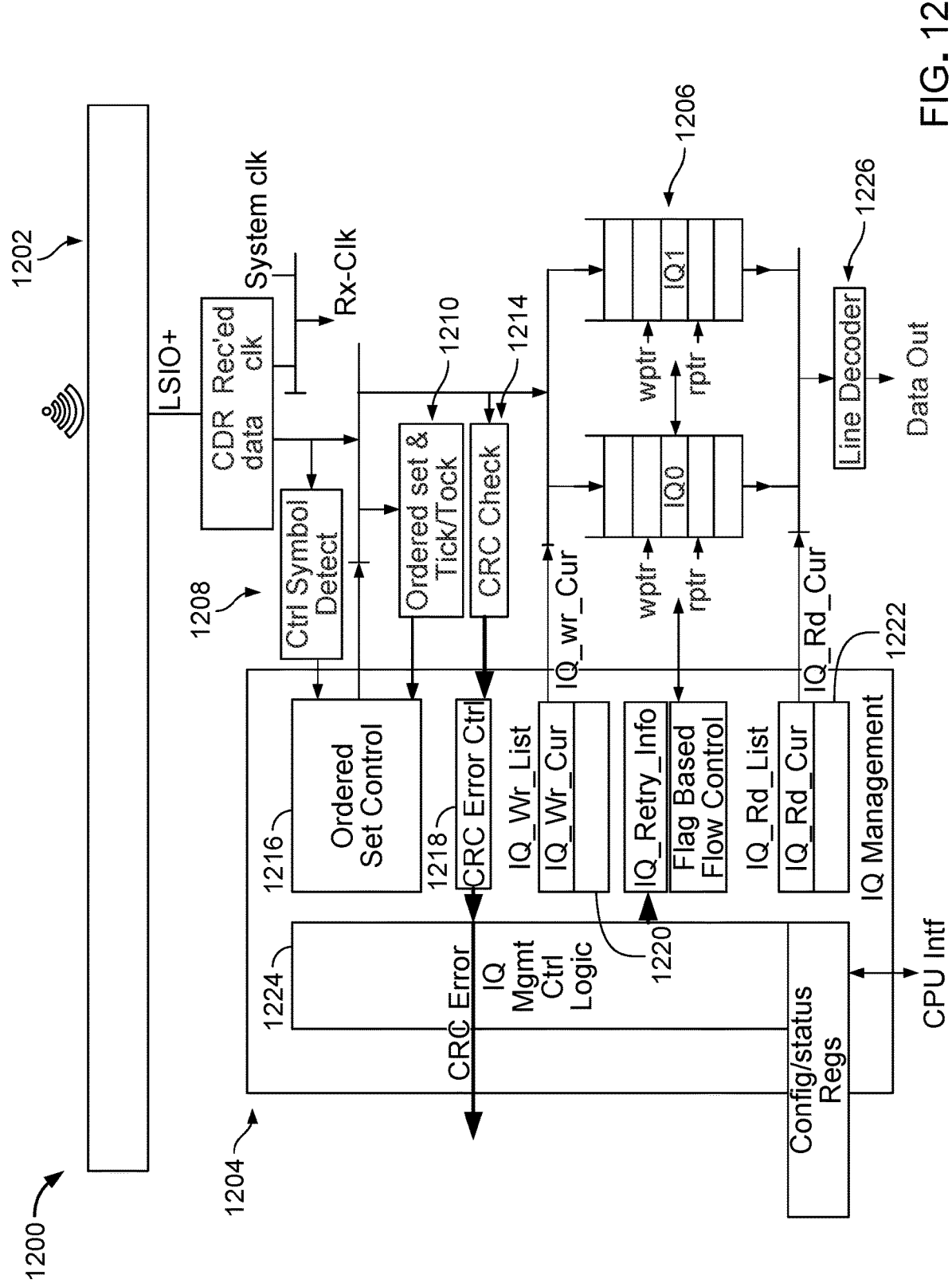
FIG. 12 is a block diagram illustrating communication using ingress queues.

FIG. 12 is a block diagram 1200 illustrating communication using ingress queues. Diagram 1200 illustrates data flow 1202 for received data from a transmitting device including storage in ingress queues as well as an ingress queue management module 1204, for example, for a particular device. The ingress queues 1206 are configured, for example, to store received payloads while in a receiving mode until error checking is satisfied.

Each ingress queue includes three stages. A new buffer indicating data can be written to the queue, a ready buffer indicating data can be transmitted to a device processor, and a retry buffer that holds the data for possible retransmission in response to an error checking analysis. A new buffer becomes a ready buffer when the new buffer is full and a ready buffer is available or when a timeout occurs for the new buffer, e.g., waited long enough to send data out. In some implementations, the new buffer and ready buffer are implemented as a ring buffer.

Received data packets can be processed upon receipt, for example through analysis of header information, to verify the data protocol and determine clock information. Received tick/tock packets can be identified 1210 and provided to the ingress management module 1204, for example, to be used by ordered set control module 1216 to switch from receive mode to transmit mode. CRC codes included in the data can be used to perform a CRC check 1214 to identify errors, which are used by CRC error control 1218 to manage retry attempts including sending a NAK message back to the device sending the data.

The data payloads of the received data packets are written to the new buffer of one or more of the ingress queues 1206. Two ingress queues 1206 are illustrated in diagram 1200, however additional ingress queues can be included. The ingress queues can be managed through list based management. An ingress write list 1220 is generated where the most recent data received to be queued is placed at the top of the list as the "ingress write current." An ingress read list 1222 is also generated where the most recent available read data as the "ingress read current." When a read is completed, the ingress read current is appended to the ingress write list indicating the queue just read is available for write. When a write is completed, the ingress write current is appended to the ingress read list indicating the queue just written is available for read.

If no error is received, incoming data is written to the ingress write current without reading out from the ingress queue. The device generates an ACK packet. The ingress queue write current is appended to the ingress queue read list. The ingress queue to be written to next is indicated, e.g., the second ingress queue and the queued data is read out from the first ingress queue. When the read is completed, the entry to the ingress queue read list is appended to the ingress queue write list and a new ingress queue current becomes the next queue to be read. Data leaving the queue can be decoded by line decoder 1226 and sent, for example, to a processor of the device or to a storage location of the device.

When an error, e.g., a CRC error, is detected for particular received data, the queued data remains in the ingress queue write list. The ingress queue management control logic 1224 initiates retry attempts including sending a NAK response after switching the device to transmit mode. In response to the NAK message, the transmitting device resends the data. Pointers are reset to previous states and ready to repeat the write operation. When data is received, it is read out from the ingress queue read current. When the read is completed, it is appended to the ingress queue write list. The new ingress queue current becomes the next queue to be read. If the retry data has no error, then the ingress queue write list entry is added to the ingress queue read list.

Figure 13:
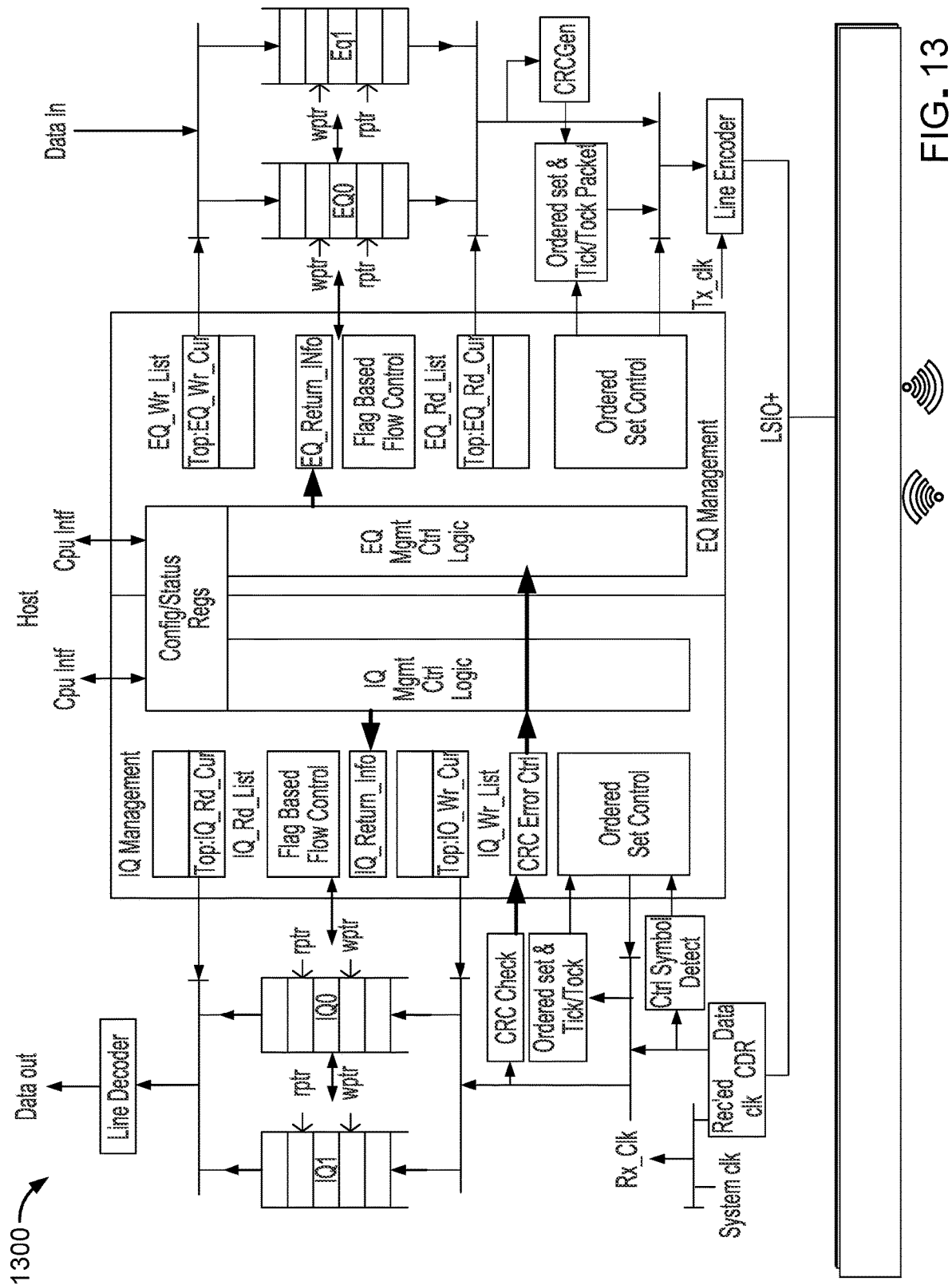
FIG. 13 is a block diagram illustrating communication between devices.

FIG. 13 is a block diagram 1300 illustrating communication between devices. In diagram 1300 the back and forth half duplex communication using respective ingress and egress queues for each device is shown. As such, diagram 1300 combines the components described in FIGS. 11-12 above for each device. In particular, a host device includes both ingress queues and ingress queue management as well as egress queues and egress queue management. Similarly, the connected device includes both ingress queues and ingress queue management as well as egress queues and egress queue management.

Power Management, Initialization, and Link Bring-Up

Figure 14:
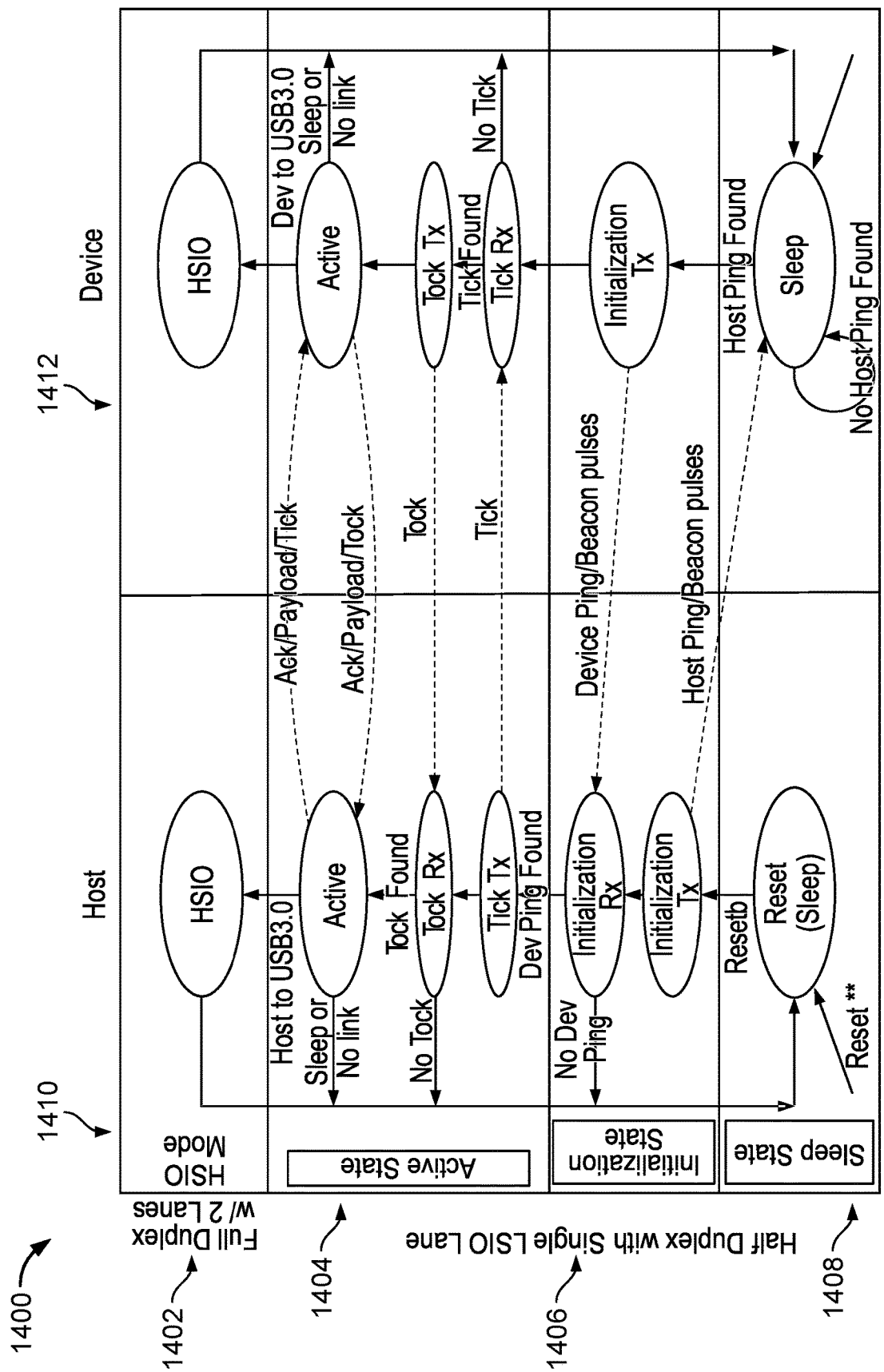
FIG. 14 is a diagram illustrating operating states for communication modules.

FIG. 14 is a diagram 1400 illustrating operating states for communication modules. In some implementations, full duplex mode can operate in a single high speed state 1402 while half duplex mode can operate in multiple states. In particular, as shown in FIG. 14, the lower speed half duplex mode can operate in active state 1404, an initialization state 1406, and a sleep state 1408. In some implementations, a further deep sleep state can also be included. In other implementations, the full duplex mode includes lower power sub-states as well. Full duplex mode can include two or more communication lanes where each lane of a device may be configured to operate as a transmitter, receiver, or transceiver. The configuration of the two or more lanes may vary based on lower power sub-states, for example, to deactivate one or more lane. These different states allow for power savings when devices are engaged but data is not being actively transmitted. In particular, one or more of the devices may rely on battery power such that controlling power consumption is important. For example, a sleep state can trigger powering down of one or more components to reduce power usage.

In active state 1404, normal packet transmissions in transmitter mode occur including ACK packets, payload packets, tick, and tock packets. Similarly, in active state 1404, receiver mode operates similarly to receive ACK, tick, and tock packets as well as receive data transmissions in packet payloads from the transmitter. For example, a host device 1410 can send payload information as well as a tick packet to a device 1412 indicating that the device can switch from receiver mode to transmitter mode. The device 1412 can then transmit an ACK indicating the previous data was correctly received as well as additional payload data. The device 1412 can include a tock packet indicating that the host device can switch from receiver mode to transmitter mode.

In the initialization state 1406 and the sleep state 1408, a device in transmitter mode sends ping pulses according to a specified periodic frequency. In initialization state 1406 and sleep state 1408, a device in receiver mode receives the ping pulses and initiates a return ping back. For example, the host device 1410 can periodically send a host ping to the device 1412. The device 1412 can then return a device ping. One way in which the initialization state and sleep state differ is configuration information. The initialization state may occur prior to any configuration of communication links with another device. Sleep state may occur after configuration and the configuration information can be retained while in the sleep state. Thus, when coming out of sleep, configuration information may not need to be exchanged. By contrast, when coming out of the initialization state, configuration information can be exchanged. The configuration information can include device capabilities, speed, data rates, identification information of the devices, and/or authentication success or failure.

In some implementations, an additional state can include a NAP state. The NAP state can be considered a mezzanine state to the sleep mode. The NAP state can be enabled when host or device has not seen transaction for certain period of time but is likely to see activity soon. In the NAP state, most blocks are in low power mode with no running clock and only the external interface block is enabled to see a transaction and can bring all blocks to fully operating states quickly. If a transaction is not detected for a certain interval, for example, 1 ms, the host or device can enter into the NAP state. In the NAP state, each device is ready to move to active state within a short time interval, for example, 10 µs after a transaction is detected. The host or device can further move from NAP state to sleep state when it does not detect a transaction for additional time interval, for example, 4 ms. While in the NAP state, the host and device exchange tick and tock packets at predetermined time interval, for example, 0.5 ms, to collect status. These tick and tock packets run blocks by supplying clocks momentarily during exchange and these packets are not counted as transaction.

Figure 15:
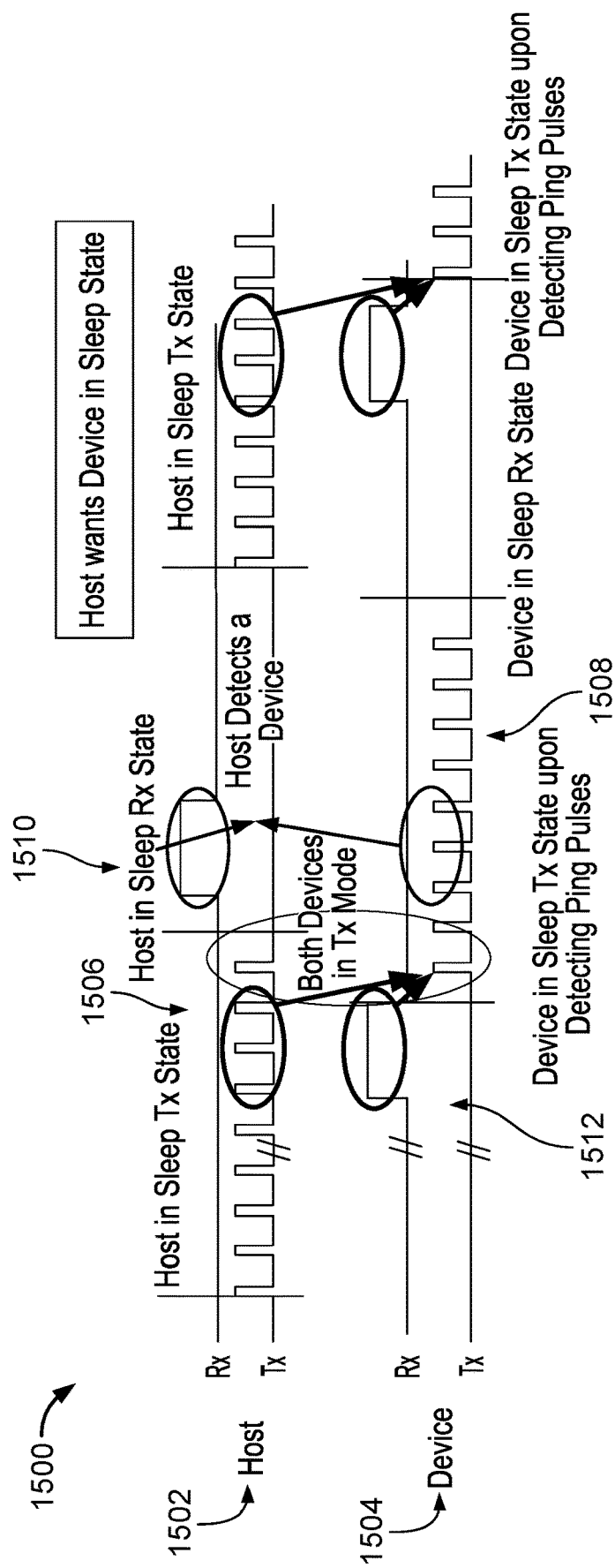
FIG. 15 is a diagram illustrating sleep state communication.

FIG. 15 is a diagram 1500 illustrating sleep state communication between a host device 1502 and a device 1504. In some implementations, the host device 1502 and the device 1504 are peer devices in which one acts as the host, for example, as designated when establishing communication between the devices.

As shown in FIG. 15, the host device 1502 operating as a transmitter in sleep state sends periodic pings 1506 to the device 1504. After sending a set of pings, the host device 1502 switches to operating as a receiver in sleep state and listens for a return ping 1508 from the device 1504, which is detected as shown in 1510. The device 1504, is operating as a receiver in sleep state and detects the pings from the host 1502. Upon detection 1512 of the ping packets 1506 from the host 1502, the device 1504 switches to operating as a transmitter in sleep state and transmits the return ping packets 1508. After sending the return ping packets 1508, the device 1504 returns to operating as a receiver in sleep state and the process repeats.

Figure 16:
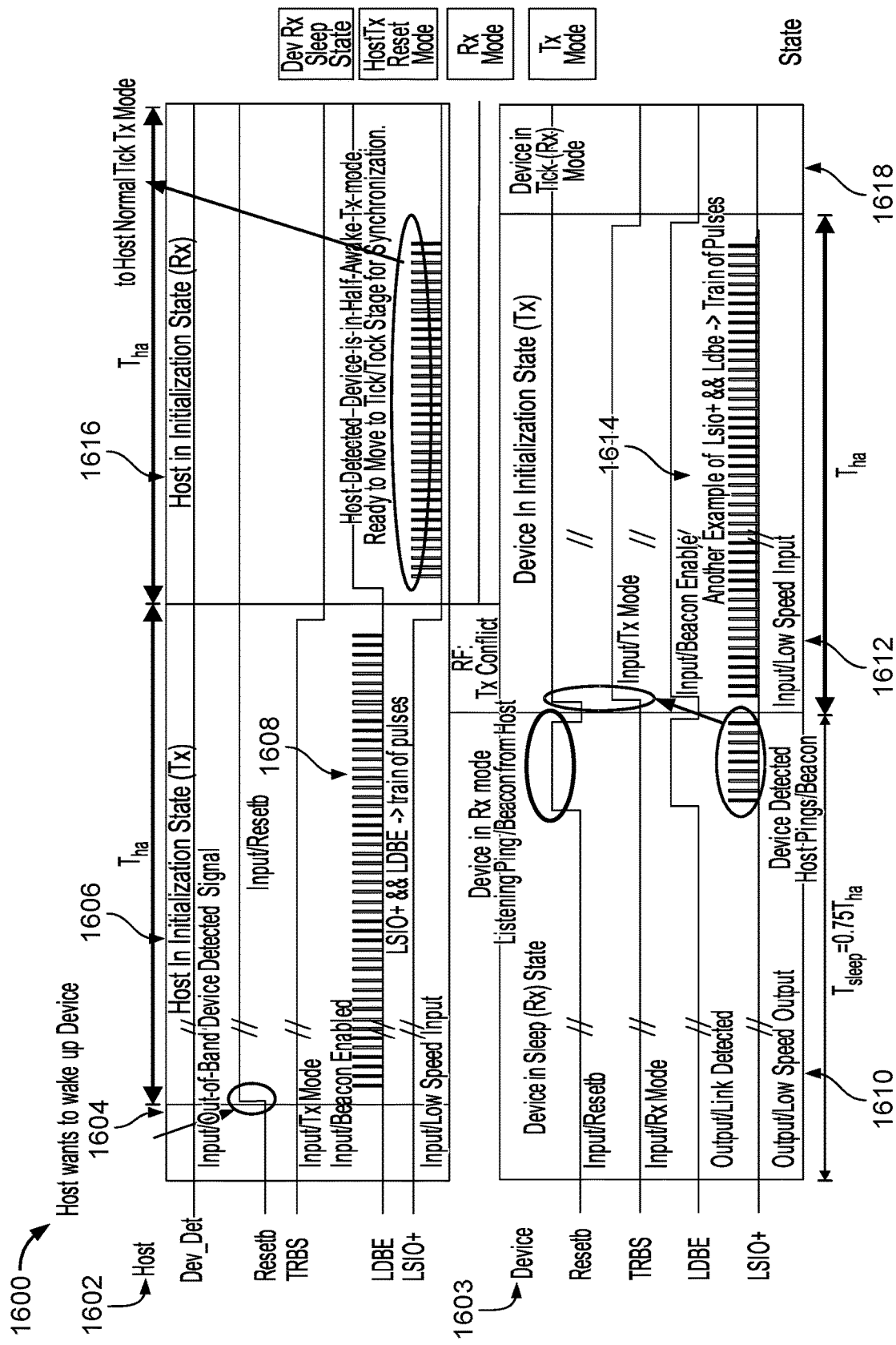
FIG. 16 is a diagram illustrating a transition from half-awake to active state communication.

FIG. 16 is a diagram 1600 illustrating a transition from an initialization state to an active state for communication between a host device 1602 and a device 1604. In some implementations, the host device 1602 and the device 1604 are peer devices in which one acts as the host, for example, as designated when establishing communication between the devices.

As shown in FIG. 16, a host 1602 is initially in a sleep state. However, at time 1604, the host 1602 detects a device 1603 using a side-band signal. For example, the host device 1602 can use a hall-effect sensor to detect the presence of the device 1603. The device 1603 may or may not have a similar sensor. In particular, a device may not need side-band detection if it receives power from the host when connected and can instead use the detection of incoming power as an indicator. Using the side-band signal further saves energy for the host because it does not need to send periodic in-band pinging to search for a present device.

Upon detection of the device 1603, the host 1602 enters initialization state 1606. In the initialization state, the host 1602, to wake up the device 1603, transmits a series of pulses 1608 to the device 1603. After transmitting the pulses, the host 1602 enters an initialization state in receiver mode 1616.

The device 1603 is initially in a sleep state as a receiver 1610. Upon receiving the series of pings from the host 1602, the device 1603 enters an initialization state in transmitter mode 1612. The device 1603 then sends a return series of pulses 1614 to the host 1602. After transmitting the return series of pulses, the device 1603 enters an active state in receiver mode 1618.

The host 1602 receives the series of pulses in the initialization state 1616. In response to receiving the pulses from the device 1603, the host 1602 enters an active state.

There exists a critical timing relationship on the receiving period in sleep state of the device 1603 and the transmission pulses in initialization state of the host 1602. In particular it is important to set the respective periods such that the device 1603 cannot miss the ping pulses sent by the host. In some implementations, the width of the series of pulses transmitted by the host is longer than the listen period for the device in the sleep state. Even when the device missed the initial series of pulses, it still has a second chance to detect the host's series of pulses sent in the initialization state. For example, in some implementations, the device listen period is 0.75 of the width of the host's series of ping pulses.

After entering active state, the host and device can set configuration based on their respective capabilities, e.g., when connected for the first time. After setting configuration, the host and the device perform an authentication process as a last step of pairing. Once authenticated successfully, the host can check for full duplex mode capability and set configuration for full duplex if available. In some implementations, once in full duplex mode, the host and device operate in full duplex mode and they cannot come back to half duplex mode unless the communication link between the host and the device gets a hard reset. In some other implementations, once in full duplex mode, the devices may return to the half-duplex mode after an idle period or when directed by the host or device.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

A number of embodiments of the invention have been described. Nevertheless, it will be understood that various modifications may be made without departing from the spirit and scope of the invention. Accordingly, other embodiments are within the scope of the following claims.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a sub combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method comprising:
   determining, at a first device, that a second device is positioned within proximity of the first device;
   in response to the determining that the second device is positioned within proximity of the first device, entering an initialization state from a sleep state, wherein in the initialization state:
   transmitting, by a transceiver of the first device, a series pulses to the second device to wake up the second device, wherein a width of the series of pulses is set to be longer than a listen period of the second device in the sleep state; and
   switching the transceiver to a receiver mode to listen for return pulses from the second device;
   in response to receiving one or more return pulses from the second device, entering an active state; and
   communicating with the second device in the active state using the first transceiver.

2. The method of claim 1, wherein communicating with the second device using the first transceiver comprises:
   configuring communication with the second device including determining whether full duplex communication is available on the second device;
   in response to a determination that full duplex communication is not available, communicating with the second device in half duplex mode using the transceiver; and
   in response to a determination that full duplex communication is available, communicating with the second device in full duplex mode using the transceiver and one or more receivers or additional transceivers.

3. The method of claim 2, wherein communicating with the second device in half duplex mode comprises:
   sending a tick packet to the second device to indicate that the second device can switch to a transmitter mode;
   switching to the receiver mode after sending the tick packet;
   receiving a tock packet from the second device indicating that the first device can return to transmitter mode; and
   switching back to transmitter mode.

4. The method of claim 1, wherein determining that the second device is positioned within proximity of the first device comprises using a side-band signal to detect the presence of the second device.

5. The method of claim 1, wherein the series of pulses are selected to cover a particular time period based on a sleep state receiving period of another device.

6. A method comprising:
   receiving, at a transceiver of a first device in a sleep state operating in receiver mode, one or more pulses transmitted by a host device, wherein the sleep state comprises periodic listening periods each having a duration based on a width of a series of pulses transmitted by the host device;
   in response to receiving the one or more pulse, entering an initialization state from the sleep state and switching the transceiver of the first device to a transmitter mode;
   transmitting a series of return pulses to the host device;
   switching to an active state and switching the transceiver to a receiver mode; and
   communicating with the host device in the active state using the transceiver.

7. The method of claim 6, wherein communicating with the host device comprises:
- receiving a half duplex communication from the host device including configuration information for configuring communication between the first device and the host device;
- in response to a determination that full duplex communication is not available based on the configuration information, communicating with the host device in half duplex mode using the transceiver; and
- in response to a determination that full duplex communication is available based on the configuration information, communicating with the host device in full duplex mode using the transceiver and one or more receivers or additional transceivers.

8. The method of claim 7, wherein communicating with the host device in half duplex mode comprises:
- receiving communications from the host device including a tick packet indicating that the first device can switch to a transmitter mode;
- switching the transceiver to the transmitter mode;
- sending communications to the host device including a tock packet indicating that the host device can return to transmitter mode; and
- returning the transceiver back to receiver mode.

9. The method of claim 6, wherein in the sleep state, the device periodically activates a receiver for a specified receiving period to receive pulses sent by the host.

10. A system comprising:
- a first device comprising one or more communication modules each including one or more integrated circuit packages, wherein the first device is configured to perform operations comprising:
  - determining, at the first device, that a second device is positioned within proximity of the first device;
  - in response to the determining that the second device is positioned within proximity of the first device, entering an initialization state from a sleep state, wherein in the initialization state:
    - transmitting, by a transceiver of the first device, a series pulses to the second device to wake up the second device, wherein a width of the series of pulses is set to be longer than a listen period of the second device in the sleep state; and
    - switching the transceiver to a receiver mode to listen for return pulses from the second device;
  - in response to receiving one or more return pulses from the second device, entering an active state; and
  - communicating with the second device in the active state using the first transceiver.

11. The system of claim 10, wherein communicating with the second device using the first transceiver comprises:
- configuring communication with the second device including determining whether full duplex communication is available on the second device;
- in response to a determination that full duplex communication is not available, communicating with the second device in half duplex mode using the transceiver; and
- in response to a determination that full duplex communication is available, communicating with the second device in full duplex mode using the transceiver and one or more receivers or additional transceivers.

12. The system of claim 11, wherein communicating with the second device in half duplex mode comprises:
- sending a tick packet to the second device to indicate that the second device can switch to a transmitter mode;
- switching to the receiver mode after sending the tick packet;
- receiving a tock packet from the second device indicating that the first device can return to transmitter mode; and
- switching back to transmitter mode.

13. The system of claim 10, wherein determining that the second device is positioned within proximity of the first device comprises using a side-band signal to detect the presence of the second device.

14. The system of claim 10, wherein the series of pulses are selected to cover a particular time period based on a sleep state receiving period of another device.

15. A system comprising:
- a first device comprising one or more communication modules each including one or more integrated circuit packages, wherein the first device is configured to perform operations comprising:
  - receiving, at a transceiver of the first device in a sleep state operating in receiver mode, one or more pulses transmitted by a host device, wherein the sleep state comprises periodic listening periods each having a duration based on a width of a series of pulses transmitted by the host device;
  - in response to receiving the one or more pulses, entering an initialization state from the sleep state and switching the transceiver of the first device to a transmitter mode;
  - transmitting a series of return pulses to the host device;
  - switching to an active state and switching the transceiver to a receiver mode; and
  - communicating with the host device in the active state using the transceiver.

16. The system of claim 15, wherein communicating with the host device comprises:
- receiving a half duplex communication from the host device including configuration information for configuring communication between the first device and the host device;
- in response to a determination that full duplex communication is not available based on the configuration information, communicating with the host device in half duplex mode using the transceiver; and
- in response to a determination that full duplex communication is available based on the configuration information, communicating with the host device in full duplex mode using the transceiver and one or more receivers or additional transceivers.

17. The system of claim 16, wherein communicating with the host device in half duplex mode comprises:
- receiving communications from the host device including a tick packet indicating that the first device can switch to a transmitter mode;
- switching the transceiver to the transmitter mode;
- sending communications to the host device including a tock packet indicating that the host device can return to transmitter mode; and
- returning the transceiver back to receiver mode.

18. The system of claim 15, wherein in the sleep state, the device periodically activates a receiver for a specified receiving period to receive pulses sent by the host.

* * * * *